United States Patent
Kennedy, III et al.

(10) Patent No.: US 7,074,138 B2
(45) Date of Patent: *Jul. 11, 2006

(54) GOLF BALL

(75) Inventors: Thomas J. Kennedy, III, Wilbraham, MA (US); Mark L. Binette, Ludlow, MA (US); Michael John Tzivanis, Chicopee, MA (US); R. Dennis Nesbitt, Westfield, MA (US); John L. Nealon, Springfield, MA (US); Vincent J. Simonds, Brimfield, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/147,803

(22) Filed: Jun. 7, 2005

(65) Prior Publication Data

US 2005/0227785 A1 Oct. 13, 2005

Related U.S. Application Data

(63) Continuation of application No. 10/618,412, filed on Jul. 11, 2003, now Pat. No. 6,902,499, which is a continuation of application No. 09/766,234, filed on Jan. 19, 2001, now Pat. No. 6,612,941, which is a continuation-in-part of application No. 09/394,829, filed on Sep. 13, 1999, now Pat. No. 6,277,024, which is a continuation-in-part of application No. 08/870,585, filed on Jun. 6, 1997, now abandoned, application No. 09/766,234, which is a continuation-in-part of application No. 08/840,392, filed on Apr. 29, 1997, now Pat. No. 5,779,562, which is a continuation of application No. 08/631,613, filed on Apr. 10, 1996, now Pat. No. 5,803,831, which is a continuation-in-part of application No. 08/591,046, filed on Jan. 25, 1996, now abandoned, and a continuation-in-part of application No. 08/542,793, filed on Oct. 13, 1995, now abandoned, which is a continuation of application No. 08/556,237, filed on Nov. 9, 1995, now abandoned, which is a continuation-in-part of application No. 08/070,510, filed on Jun. 1, 1993, now abandoned, application No. 09/766,234.

(60) Provisional application No. 60/171,701, filed on Dec. 22, 1999.

(51) Int. Cl.
*A63B 37/06* (2006.01)

(52) U.S. Cl. .................................... 473/376

(58) Field of Classification Search ................ 473/376, 473/377, 351, 373, 374
See application file for complete search history.

(56) References Cited

U.S. PATENT DOCUMENTS 6,431,999 B1 * 8/2002 Nesbitt ....................... 473/372

(Continued)

*Primary Examiner*—Raeann Gorden
(74) *Attorney, Agent, or Firm*—Michael A. Catania; Elaine H. Lo

(57) ABSTRACT

The present invention is directed to a solid, non-wound, golf ball comprising two or more core components, and a cover component. The core components comprise i) a small, inner, high density, spherical center component comprising a blend of powdered metal and a first matrix material; and, ii) an outer core layer disposed about the spherical center component, formed from a second matrix material. The golf ball may further comprise a second or additional outer core layer(s) that surround the first outer core layer. The cover may be single or multi-layered. For a multi-layered cover, the inner cover layer is comprised of a hard, high modulus material and the outer cover layer is comprised of a soft, very low modulus material and/or a non-ionomeric thermoplastic elastomer such as polyurethane, polyester or polyetheramide. Separately, the inner and/or outer cover layers are very thin in construction. The resulting golf ball of the present invention provides for enhanced playability characteristics (i.e., spin and feel) without sacrificing distance or durability properties.

3 Claims, 1 Drawing Sheet

U.S. PATENT DOCUMENTS 6,458,047 B1 * 10/2002 Nesbitt ................ 473/372
6,612,941 B1 * 9/2003 Kennedy et al. ............ 473/376
6,616,551 B1 * 9/2003 Nesbitt et al. ............... 473/376
6,902,499 B1 * 6/2005 Kennedy et al. ............ 473/376

* cited by examiner

GOLF BALL

CROSS REFERENCES TO RELATED APPLICATIONS

This application is a continuation of U.S. patent application Ser. No. 10/618,412, filed Jul. 11, 2003 now U.S. Pat. No. 6,902,499, which is a continuation of U.S. patent application Ser. No. 09/766,234 filed Jan. 19, 2001, now U.S. Pat. No. 6,612,941, which is a continuation-in-part application of U.S. patent application Ser. No. 09/394,829, filed on Sep. 13, 1999, now U.S. Pat. No. 6,277,024. That application is a continuation-in-part of U.S. patent application Ser. No. 08/870,585, filed Jun. 6, 1997, now abandoned, which is a continuation of U.S. patent application Ser. No. 08/556,237, filed Nov. 9, 1995, now abandoned, which is a continuation-in-part of U.S. patent application Ser. No. 08/070,510 filed Jun. 1, 1993, now abandoned. Application Ser. No. 09/766,234 is also a continuation-in-part application of U.S. patent application Ser. No. 08/840,392, filed Apr. 29, 1997, now U.S. Pat. No. 5,779,562, which is a continuation-in-part of U.S. patent application Ser. No. 08/631,613, filed Apr. 10, 1996, now U.S. Pat. No. 5,803,831, which in turn is a continuation-in-part of U.S. patent application Ser. No. 08/591,046, filed on Jan. 25, 1996, now abandoned, and U.S. patent application Ser. No. 08/542,793, filed on Oct. 13, 1995, now abandoned, which in turn is a continuation-in-part of U.S. patent application Ser. No. 08/070,510, filed on Jun. 1, 1993, now abandoned. Application Ser. No. 09/766,234 also claims priority to U.S. Provisional Application Ser. No. 60/171,701, filed Dec. 22, 1999.

FIELD OF THE INVENTION

The present invention relates to golf balls and specifically to the construction of solid, non-wound, golf balls for regulation play. More particularly, the invention is directed to improved golf balls comprising multiple core assemblies which have a comparatively small, high-density, polymeric center, or nucleus, component. The small, heavy center component in combination with the particular remaining core and very thin cover components produces a golf ball having a smaller moment of inertia about its central axis. This results in a golf ball which exhibits enhanced spin while maintaining or improving additional golf ball characteristics such as durability, resiliency and compression.

Furthermore, the small, heavy weight, polymeric center component of the invention is preferably produced without the use of one or more peroxide crosslinking, or co-crosslinking agents comprising a metal salt of an unsaturated fatty or carboxylic acid. These crosslinking agents or co-agents are the reaction product of an unsaturated carboxylic acid or acids and an oxide or carbonate of a metal such as zinc. Examples of such crosslinking agents, which again are preferably not incorporated into the present inventions, or if so, only to a minimal amount, include zinc diacrylate and zinc dimethacrylate. Accordingly, the polymeric centers of the golf balls of the present invention are generally free from peroxide crosslinking agents and exhibit high densities.

Additionally, in a more preferred aspect, the small, heavy center component of the invention is produced through the use of a blend of polybutadiene and polyisoprene rubbers. Powdered metal materials and other materials, including curing agents, may be incorporated therein to produce a high density, spherical center component that is commercially processable.

Moreover, in a particularly preferred aspect, the balls of the invention further utilize a multi-layer cover assembly. The inner and outer cover layers are very thin (i.e., about 0.055 inches or less) in thickness. The improved multi-layer cover golf balls provide enhanced distance and durability properties over single layer cover golf balls while at the same time offering enhanced "feel" and spin characteristics generally associated with soft balata and balata-like covers of the prior art.

BACKGROUND OF THE INVENTION

Golf balls traditionally have been categorized in three different groups, namely, as one-piece balls, multi-piece solid (two or more pieces) balls, and wound (three piece) balls. The one-piece ball typically is formed from a solid mass of moldable material which has been cured to develop the necessary degree of hardness. It possesses no significant difference in composition between the interior and exterior of the ball. These balls do not have an enclosing cover. One-piece balls are described, for example, in U.S. Pat. Nos. 3,313,545; 3,373,123; and, 3,384,612.

The wound ball is frequently referred to as a three piece ball since it is made with a vulcanized rubber thread wound under tension around a solid or semi-solid center to form a wound core and thereafter enclosed in a single or multilayer covering of tough protective material. For many years the wound ball satisfied the standards of the U.S.G.A. and was desired by many skilled, low handicap golfers.

The three-piece wound ball typically has a balata cover which is relatively soft and flexible. Upon impact, it compresses against the surface of the club producing high spin. Consequently, the soft and flexible balata covers along with the wound cores provide an experienced golfer with the ability to apply a spin to control the ball in flight in order to produce a draw or a fade or a backspin which causes the ball to "bite" or stop abruptly on contact with the green. Moreover, the balata cover produces a soft "feel" to the low handicap player. Such playability properties of workability, feel, etc. are particularly important in short iron play with low swing speeds and are exploited significantly by high skilled players.

However, a three-piece wound ball also has several disadvantages. For example, a wound ball is relatively difficult to manufacture due to the number of production steps required and the careful control which must be exercised in each stage of manufacture to achieve suitable roundness, velocity, rebound, "click", "feel", and the like.

Additionally, a soft wound (three piece) ball is not well suited for use by the less skilled and/or high handicap golfer who cannot intentionally control the spin of the ball. For example, the unintentional application of sidespin by a less skilled golfer produces hooking or slicing. The sidespin reduces the golfer's control over the ball as well as reducing travel distance.

Similarly, despite all the benefits of balata, balata covered balls are easily cut and/or damaged if mis-hit. Consequently, golf balls produced with balata or balata containing cover compositions, can exhibit a relatively short life spans. As a result of this negative property, balata and its synthetic substitute, trans-polyisoprene, and resin blends, have been essentially replaced as the cover materials of choice by golf ball manufacturers by materials comprising ionomeric resins and other elastomers such as polyurethanes.

Conventional multi-piece solid golf balls, on the other hand, include a solid resilient core having single or multiple cover layers employing different types of material molded on the core. The one piece golf ball and the solid core for a multi-piece solid (nonwound) ball frequently are formed from a combination of materials such as polybutadiene and other rubbers cross linked with zinc diacrylate or zinc dimethacrylate, and containing fillers and curing agents which are molded under high pressure and temperature to provide a ball of suitable hardness and resilience. For multi-piece nonwound golf balls, the cover typically contains a substantial quantity of ionomeric resins that impart toughness and cut resistance to the covers.

Ionomeric resins are generally ionic copolymers of an olefin, such as ethylene, and a metal salt of an unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, such as durability, for golf ball cover construction. However, some of the advantages gained in increased durability have been offset to some degree by decreases in playability. This is because, although the ionomeric resins are very durable, they also tend to be quite hard when utilized for golf ball cover construction and thus lack the degree of softness required to impart the spin necessary to control the ball in flight. Since most ionomeric resins are harder than balata, the ionomeric resin covers do not compress as much against the face of the club upon impact, thereby producing less spin. In addition, the harder and more durable ionic resins lack the "feel" characteristic associated with the softer balata related covers.

As a result, while there are currently more than fifty (50) commercial grades of ionomers available, both from DuPont and Exxon, with a wide range of properties which vary according to the type and amount of metal ions, molecular weight, composition of the base resin (i.e. relative content of ethylene and methacrylic and/or acrylic acid groups) and additive ingredients, such as reinforcement agents, etc., a great deal of research continues in order to develop golf ball cover compositions exhibiting not only the improved impact resistance and carrying distance properties produced by the "hard" ionomeric resins, but also the playability (i.e. "spin", "feel", etc.) characteristics previously associated with the "soft" balata covers, properties which are still desired by the more skilled golfer.

Moreover, a number of multi-piece solid balls have also been produced to address the various needs of the golfing populations. The different types of material used to formulate the core(s), cover(s), etc. of these balls dramatically alter the balls' overall characteristics.

In this regard, various structures have been suggested using multilayer cores and single layer covers wherein the core layers have different physical characteristics. For example, U.S. Pat. Nos. 4,714,253; 4,863,167 and 5,184,828 relate to three-piece solid golf balls having improved rebound characteristics in order to increase flight distance. The '253 patent is directed towards differences in the hardness of the layers. The '167 patent relates to a golf ball having a center portion and an outer layer having a high specific gravity. Preferably, the outer layer is harder than the center portion. The '828 patent suggests that the maximum hardness must be located at the interface between the core and the mantle, and the hardness must then decrease both inwardly and outwardly.

Similarly, a number of patents for multi-piece solid balls suggest improving the spin and feel by manipulating the core construction. For example, U.S. Pat. No. 4,625,964 relates to a solid golf ball having a core diameter not more than 32 mm, and an outer layer having a specific gravity lower than that of the core. In U.S. Pat. No. 4,650,193, it is suggested that a curable core elastomer be treated with a cure-altering agent to soften an outer layer of the core. U.S. Pat. No. 5,002,281 is directed towards a three piece solid golf ball which has an inner core having a gravity greater than 1.0, but less than or equal to that of the outer shell which must be less than 1.3. U.S. Pat. Nos. 4,848,707 and 5,072,944 disclose three-piece solid golf balls having center and outer layers of different hardness. Other examples of such dual layer cores can be found in, but are not limited to, the followings patents: U.S. Pat. Nos. 4,781,383; 4,858,924; 5,002,281; 5,048,838; 5,104,126; 5,273,286; 5,482,285 and 5,490,674. It is believed that all of these patents are directed to balls with single cover layers.

Multilayer covers containing one or more ionomeric resins have also been formulated in an attempt to produce a golf ball having the overall distance, playability and durability characteristics desired. This was addressed in U.S. Pat. No. 4,431,193, where a multilayered golf ball cover is described as having been produced by initially molding a first cover layer on a spherical core and then adding a second cover layer. The first or inner layer is comprised of a hard, high flexural modulus resinous material to provide a gain in coefficient of restitution while the outer layer is a comparatively soft, low flexural modulus resinous material to provide spin and control. The increase in the coefficient of restitution provides a ball which serves to attain or approach the maximum initial velocity limit of 255 feet per second, as provided by the United States Golf Association (U.S.G.A.) rules. The relatively soft, low flexural modulus outer layer provides for an advantageous "feel" and playing characteristics of a balata covered golf ball.

In various attempts to produce a durable, high spin ionomeric golf ball, the golfing industry has also blended the hard ionomer resins with a number of softer ionomer resins. U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid and an acrylate ester. It has been found that golf ball covers formed from hard-soft ionomer blends tend to become scuffed more readily than covers made of hard ionomer alone.

Most professional golfers and good amateur golfers desire a golf ball that provides good distance when hit off a driver, control and stopping ability on full iron shots, and high spin for short "touch and feel" shots. Many conventional two piece and thread wound performance golf balls have undesirable high spin rates on full shots. The excessive spin on full shots is a sacrifice made in order to achieve more spin on the shorter touch shots. Consequently, it would be desirable to produce a multi-piece golf ball that exhibited low spin on full iron and wood shots and high spin in the "touch" and "feel" shots which occur with the high lofted irons and wedges around the green.

In this regard, the multi-piece nonwound balls, while having an advantage with respect to cut resistance, typically have a cover that is sufficiently hard so as to provide low deformation upon impact and a small contact area between the ball and the club face. This provides a greater degree of "slipperiness" on the clubface and, therefore, less control over the ball and greater difficulty in stopping the ball on the green when using short irons. At least some of these deficiencies are considered to result also from a large moment of inertia exhibited by the multi-piece balls. Thus, it would be useful to develop a ball with a controlled moment of inertia coupled with a soft cover layer in order to provide the desired backspin when using short irons, but at the same time without adversely impacting the desired flight and roll distance of the ball when using a driver.

A dual core, dual cover ball is described in U.S. Pat. No. 4,919,434. However, the patent emphasizes the hardness characteristics of all layers, particularly the requirement for a soft inner cover layer and a hard outer cover layer. With respect to the core, it requires that the layers should not differ in hardness by more than 10 percent and should be elastomeric materials having a specific deformation range under a constant load.

U.S. Pat. No. 5,104,126 attempts to concentrate the weight of the golf ball in the center core region by utilizing a metal ball as the core component. However, that patent teaches the use of a solid metal ball as the core component which provides substantially different properties than a polymeric core. Moreover, that patent also teaches the use of density reducing filler materials incorporated elsewhere in the golf ball. Although perhaps satisfactory in some respects, in other respects, it is undesirable to add density-reducing fillers to offset the weight of the center core component. Additionally, it would be desirable to simply avoid the use of density reducing fillers if possible as they tend to lower the resilience of the golf ball.

Moreover, golf balls utilized in tournament or competitive play today are regulated for consistency purposes by the United States Golf Association (U.S.G.A.). In this regard, there are five (5) U.S.G.A. specifications which golf balls must meet under controlled conditions. These are size, weight, velocity, driver distance and symmetry.

Under the U.S.G.A. specifications, a golf ball cannot weigh more than 1.62 ounces (with no lower limit) and must measure at least 1.68 inches in diameter (with no upper limit). However, as a result of the openness of the upper or lower parameters in size and weight, a variety of golf balls can be made. For example, golf balls are manufactured today by the Applicants which are slightly larger (i.e., approximately 1.72 inches in diameter) while meeting the weight, velocity, distance and symmetry specifications set by the U.S.G.A.

Additionally, according to the U.S.G.A., the initial velocity of the ball must not exceed 250 ft/sec. with a 2% maximum tolerance (i.e., 255 ft/sec.) when struck at a set club head speed on a U.S.G.A. machine. Furthermore, the overall distance of the ball must not exceed 280 yards with a 6% tolerance (296.8 yards) when hit with a U.S.G.A. specified driver at 160 ft/sec. (club head speed) at a 10 degree launch angle as tested by the U.S.G.A. Lastly, the ball must pass the U.S.G.A. administered symmetry test, i.e., fly consistency (in distance, trajectory and time of flight) regardless of how the ball is placed on the tee.

While the U.S.G.A. regulates five (5) specifications for the purposes of maintaining golf ball consistency, alternative characteristics (i.e., spin, feel, durability, distance, sound, visibility, etc.) of the ball are constantly being improved upon by golf ball manufacturers. This is accomplished by altering the type of materials utilized and/or improving construction of the balls. For example, the proper choice of the materials for the cover(s) and core(s) are important in achieving certain distance, durability and playability properties. Other important factors controlling golf ball performance include, but are not limited to, cover thickness and hardness, core stiffness (typically measured as compression), ball size and surface configuration.

Accordingly, a wide variety of golf balls have been designed and are available to suit an individual player's game. In essence, different types of balls have been specifically designed or "tailor made" for high handicap versus low handicap golfers, men versus women, seniors versus juniors, etc. Moreover, improved golf balls are continually being produced by golf ball manufacturers with technological advancements in materials and manufacturing processes.

Two of the principal properties involved in a golf ball's performance are resilience and compression. Resilience is generally defined as the ability of a strained body, by virtue of high yield strength and low elastic modulus, to recover its size and form following deformation. Simply stated, resilience is a measure of energy retained to the energy lost when the ball is impacted with the club.

In the field of golf ball production, resilience is determined by the coefficient of restitution (C.O.R.), the constant "e" which is the ratio of the relative velocity of an elastic sphere after direct impact to that before impact. As a result, the coefficient of restitution ("e") can vary from 0 to 1, with 1 being equivalent to a perfectly or completely elastic collision and 0 being equivalent to a perfectly or completely inelastic collision.

Resilience (C.O.R.), along with additional factors such as club head speed, club head mass, angle of trajectory, ball size, density, composition and surface configuration (i.e., dimple pattern and area of coverage) as well as environmental conditions (i.e., temperature, moisture, atmospheric pressure, wind, etc.) generally determine the distance a golf ball will travel when hit. Along this line, the distance a golf ball will travel under controlled environmental conditions is a function of the speed and mass of the club and the size, density, composition and resilience (C.O.R.) of the ball and other factors. The velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of principal concern among golf ball manufacturers. The factors or determinants of interest with respect to improved distance are generally the coefficient of restitution (C.O.R.), spin and the surface configuration (dimple pattern, ratio of land area to dimple area, etc.) of the ball.

The coefficient of restitution (C.O.R.) in solid core balls (i.e., molded cores and covers) is a function of the composition of the molded core and of the cover. The molded core and/or cover may be comprised of one or more layers such as in multi-layered balls.

In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, center and cover of a wound core ball may also consist of one or more layers.

The coefficient of restitution of a golf ball can be analyzed by determining the ratio of the outgoing velocity to the incoming velocity. In the examples of this writing, the coefficient of restitution of a golf ball was measured by propelling a ball horizontally at a speed of 125+/−1 feet per second (fps) against a generally vertical, hard, flat steel plate and measuring the ball's incoming and outgoing velocity electronically. Speeds were measured with a pair of Oehler Mark 55 ballistic screens (available from Oehler Research Austin Tex.), which provide a timing pulse when an object passes through them. The screens are separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it.

As indicated above, the incoming speed should be 125+/−1 fps. Furthermore, the correlation between C.O.R. and forward or incoming speed has been studied and a correction has been made over the +/−fps range so that the C.O.R. is reported as if the ball had an incoming speed of exactly 125.0 fps.

The coefficient of restitution must be carefully controlled in all commercial golf balls if the ball is to be within the specifications regulated by the U.S.G.A. As discussed to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution (C.O.R.) to closely approach the U.S.G.A. limit on initial velocity, while having an ample amount of softness (i.e., hardness) to produce the desired degree of playability (i.e., spin, etc.).

Furthermore, as mentioned above, the maximum distance a golf ball can travel (carry and roll) when tested on a U.S.G.A. driving machine set at a club head speed of 160 feet/second is 296.8 yards. While golf ball manufacturers design golf balls which closely approach this driver distance specification, there is no upper limit for how far an individual player can drive a ball. Thus, while golf ball manufacturers produced balls having certain resilience characteristics in order to approach the maximum distance parameter set by the U.S.G.A. under controlled conditions, the overall distance produced by a ball in actual play will vary depending on the specific abilities of the individual golfer.

The surface configuration of a ball is also an important variable in affecting a ball's travel distance. The size and shape of the ball's dimples, as well as the overall dimple pattern and ratio of land area to dimpled area are important with respect to the ball's overall carrying distance. In this regard, the dimples provide the lift and decrease the drag for sustaining the ball's initial velocity in flight as long as possible. This is done by displacing the air (i.e., displacing the air resistance produced by the ball from the front of the ball to the rear) in a uniform manner. Moreover, the shape, size, depth and pattern of the dimple affect the ability to sustain a ball's initial velocity.

As indicated above, compression is another property involved in the overall performance of a golf ball. The compression of a ball will influence the sound or "click" produced when the ball is properly hit. Similarly, compression can affect the "feel" of the ball (i.e., hard or soft responsive feel), particularly in chipping and putting.

Moreover, while compression of itself has little bearing on the distance performance of a ball, compression can affect the playability of the ball on striking. The degree of compression of a ball against the clubface and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking.

The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

Additionally, cover hardness and thickness are important in producing the distance, playability and durability properties of a golf ball. As mentioned above, cover hardness directly affects the resilience and thus distance characteristics of a ball. All things being equal, harder covers produce higher resilience. This is because soft materials detract from resilience by absorbing some of the impact energy as the material is compressed on striking.

However, soft covered balls are generally preferred by the more skilled golfer because he or she can impact high spin rates that give him or her better control or workability of the ball. Spin rate is an important golf ball characteristic for both the skilled and unskilled golfer. As mentioned, high spin rates allow for the more skilled golfer, such as PGA and LPGA professionals and low handicap players, to maximize control of the golf ball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

In view in part of the above information, a number of one-piece, two-piece (a solid resilient center or core with a molded cover), three-piece wound (a liquid or solid center, elastomeric winding about the center, and a molded cover), and multi-layer solid or wound golf balls have been produced to address the various needs of golfers exhibiting different skill levels. The different types of materials utilized to formulate the core(s), cover(s), etc. of these balls dramatically alter the balls' overall characteristics.

It would be useful to develop a golf ball exhibiting a high spin rate at low club head speeds when using short, high lofted irons. Such a ball would exhibit not only high spin but would also have a combination of softness and durability which is better than the softness-durability combination of a golf ball cover made from a hard-soft ionomer blend. Furthermore, it would be beneficial to produce a high spin golf ball that produces enhanced spin characteristics independent of its specific cover composition alone.

These and other objects and features of the invention will be apparent from the following summary and description of the invention, the drawings and from the claims.

SUMMARY OF THE INVENTION

Accordingly, it is a feature of the present invention to provide a multi-piece, nonwound, solid golf ball. The core is of a multilayer construction consisting of two or more polymeric components. The characteristics of the polymeric components of the core are such that the moment of inertia may be adjusted to enhance the backspin of the ball when using short irons.

An additional feature of the invention is to provide a ball having a multilayer polymeric core enclosed by a multilayer cover of very thin construction. The ball has an appropriate moment of inertia that will permit extended flight distance of the ball and good roll when using a driver, coupled with a cover having sufficient softness that will permit deformation of the ball upon impact, thereby increasing the contact area between the ball and the club face without subjecting the cover to undesirable cutting or abrasion.

Another feature of the present invention is the provision for a golf ball of the type described that comprises both multilayer cores and cover(s) in such a manner as to incorporate the desirable features associated with various categories of balls traditionally employed.

A further feature of the present invention is the provision for a golf ball core structure with an inner or center polymeric core and an outer polymeric core layer, with the inner core having a specific gravity that differs from that of the outer core layer by more than 2.0, preferably more than 3.0, and most preferably more than 6.0, thereby giving the golf ball a moment of inertia differing from that of typical solid core balls.

Yet another feature is the provision for a multilayer core that is combined with a multilayer cover wherein the outer cover layer has a lower hardness value than the inner cover layer. Separately, the inner and outer cover layers are very thin (i.e., about 0.055" or less in thickness) in construction. More preferably, the cover layers are less than 0.045 inches in thickness and most preferably about 0.040 inches in thickness.

A still further feature of the invention is the provision for a golf ball having a soft outer cover layer with good scuff resistance and cut resistance coupled with relatively high spin rates at low club head speeds.

The present invention provides in an additional aspect, a solid, nonwound golf ball, and comprising a multi-core assembly that is concentrically positioned within the center of the golf ball, and a multi-layer cover assembly disposed about the multi-core assembly. The mass and position of both the multi-core assembly and the multi-layer cover assembly are such that the moment of inertia of the golf ball is less than 0.45 oz. in$^2$, preferably less than 0.44 oz. in$^2$, and more preferably, less than 0.43 oz. in$^2$ for a 1.680" golf ball.

In yet another aspect, the present invention provides a golf ball comprising a center core component which is concentrically disposed about a reference point located at the geometric center of the golf ball. The golf ball further comprises an outer core layer which generally surrounds and is disposed about the center core component. The golf ball further comprises a first inner cover layer disposed and positioned around the outer core layer, and a second outermost dimpled cover layer that is disposed about the first inner cover layer. Preferably, an ionomeric material is used in at least one of the cover layers. The configuration of the golf ball is such that it has a moment of inertia is preferably less than 0.43 oz. in$^2$ for a 1.680" golf ball.

In yet another aspect, the present invention provides a golf ball comprising a center polymeric core component having a specific gravity in the range of from about 1.2 to about 20, preferably about 2.0 to about 18.0, and a diameter in the range from about 5 mm to about 21 mm, preferably less than 10 mm. The golf ball further comprises an outer core polymeric layer disposed about the center core layer component, the outer core layer having a specific gravity in the range from about 0.9 to about 1.2, and an outer diameter in the range from about 30 mm to about 40 mm. The golf ball further includes an inner cover layer disposed about the core layer, and an outer cover layer disposed about the inner cover layer. The golf ball more preferably exhibits a moment of inertia of less than 0.43 oz. in$^2$, and a coefficient of restitution of at least 0.760, preferably at least 0.780, and most preferably at least 0.800.

In a still further aspect, the present invention relates to a multiple core component, non-wound, golf ball having small, high density, spherical center which overcomes the above-referenced problems and others. In this regard, a smaller (i.e., a diameter of from about 5 mm to about 21 mm) and heavier spherical center or center core layer is produced using a blend composed of a first polymer matrix material comprising a mix of polybutadiene and polyisoprene rubbers and metal particles, or other high specific gravity filler materials. The blend is preferably devoid of any metal carboxylate cross-linking or co-crosslinking agents generally present in solid core golf ball production.

In this respect, the high-density center is encapsulated by one or more outer core layers and a cover assembly comprising one or more layers. The outer core layer(s) comprise a second polymer matrix material. The size and weight of the outer core layer(s) comprising a second polymeric matrix material and/or cover layers are adjusted in order to produce an overall golf ball which meets, or is less than, the 1.62 ounce maximum weight limitation specified by the U.S.G.A.

It has been found that the combination of the present invention produces a golf ball with a decreased moment of inertia and/or a lower radius of gyration. This results in the generation of higher spin without substantially affecting the resiliency of the ball. Additionally, the golf ball of the present invention exhibits a substantially similar or enhanced feel (i.e., softer compression) and overall durability.

In an additional aspect, the claimed subject matter of the present invention provides a golf ball comprising a dual polymeric core and a cover. The dual core has an inner, high density, spherical center core layer and at least one outer core layer. The high density, spherical center comprises a blend of high density powdered metal and/or other heavy weight filler materials and a first polymer matrix material selected from thermosets, thermoplastics, and combinations thereof. Preferably, the first polymer matrix material comprises a blend of about 90 to about 10 weight percent polybutadiene and of about 10 to about 90 weight percent polyisoprene. More preferably, the first polymer matrix material comprises a blend of about 70 to about 30 weight percent polybutadiene and from about 30 to about 70 weight percent polyisoprene.

Moreover, in this aspect, the inner, high density, center core layer is preferably produced without the use of metal carboxylic crosslinking agents that are generally utilized in solid golf ball core production. These crosslinking agents are the reaction product of an unsaturated carboxylic acid or fatty acids and an oxide or carbonate of a metal such as zinc. Included are metal salts of unsaturated fatty acids, for example zinc, aluminum, and calcium salts of unsaturated fatty acids having 3 to 8 carbon atoms, such as acrylic acid and methacrylic acid.

The size and weight of the center of this aspect is configured in a manner to produce a low moment of inertia and a reduced rate of gyration. For example, the inner spherical center core layer has a specific gravity of greater than 1.2, preferably greater than 4.0, and most preferably greater than 7.0.

A lower density outer core layer is disposed about the high density spherical center core layer. The outer core layer comprises a second polymer matrix material selected from thermosets, thermoplastics, and combinations thereof. The second and first polymer matrix materials can be of the same or different compositions. A cover is then molded about the dual core.

In a still additional aspect, the present invention is directed to an improved dual core golf ball having a relatively small, high density spherical center or nucleus containing powdered tungsten (or other high density powdered metals) in a first elastomeric matrix, such as a blend of polybutadiene and polyisoprene. The powdered metal elastomeric matrix is peroxide, sulfur or radiation crosslinked. Preferably no zinc diacrylate (ZDA), zinc dimethyl acrylate (ZDMA) or other unsaturated carboxylic cross-linking agents are included in the inner spherical center.

One or more outer core layers are disposed about the high density center, followed by one or more cover layers. The outer core and/or cover layers are made lighter and/or thicker in order to produce an overall golf ball which conforms with the weight and size requirements of the U.S.G.A. This combination of weight and size displacement decreases the moment of inertia and/or allows the radius of gyration of the ball to move closer to the center.

The solid, non-wound, golf balls of the invention will have a moment of inertia of less than 0.45 oz.in$^2$, preferably less than 0.44 oz.in$^2$ for a standard size golf ball. More preferably the moment of inertia is less than 0.43 oz.in$^2$ for a 1.680" diameter golf ball. The moment of inertia for oversized or enlarged golf balls, such as balls 1.70–1.72 inches in diameter, is also reduced.

The moment of inertia (i.e., "MOI") of a golf ball (also known as "rotational inertia") is the sum of the products formed by multiplying the mass (or sometimes the area) of each element of a figure by the square of its distance from a specified line such as the center of a golf ball. This property is directly related to the "radius of gyration" of a golf ball which is the square root of the ratio of the moment of inertia of a golf ball about a given axis to its mass. It has been found that the lower the moment of inertia (or the closer the radius of gyration is to the center of the ball) the higher the spin rate is of the ball with all other properties being held equally.

In all of the above aspects, the present invention is directed, in part, to decreasing the moment of inertia of a solid, non-wound, golf ball by varying the weight arrangement and composition of the core (preferably the inner spherical center core layer and the outer core layer). By varying the weight, size and density of the components of the golf ball, the moment of inertia of a golf ball can be decreased. Additionally, different types of matrix materials and/or crosslinking agents, or lack thereof, can be utilized in the core construction in order to produce an overall solid, non-wound, golf ball exhibiting enhanced spin and feel while maintaining resiliency and durability.

In one other further aspect, the claimed subject matter of the present application provides a multi-layered covered golf ball comprising a dual core and a multi-layer cover. Again, the dual core comprises an inner high density spherical center core layer and at least one outer core layer. The inner spherical center comprises a blend of high density powdered metal and/or other high density material and a first matrix material selected from about a fifty percent/fifty percent blend of polybutadiene and polyisoprene. The spherical center has a specific gravity of greater than 1.2, such as from about 2.0 to about 20.0, preferably about 4.0 to 18.0, and most preferably, about 7.6–7.8 for a 0.340"–0.344" (8.6–8.75 mm) center.

At least one outer core layer of lower density is disposed about the inner spherical center. The outer core layer comprises a second matrix material selected from thermosets, thermoplastics, and combinations thereof.

The golf ball of this aspect also comprises a multi-layer cover having at least an inner cover layer and outer cover layer. The inner cover layer is disposed about the outer core layer. The outer cover layer is disposed about and generally surrounds the inner cover layer. One or more intermediate layers may also be included.

The golf balls of the present inventions having a high density elastomeric nucleus, are more durable and softer than solid metal nucleus balls while increasing resiliency. The diameter of the center, or nucleus, is dependant upon the specific gravity of the chosen heavy weight filler and the first matrix material so that the maximum U.S.G.A. golf ball weight is not exceeded. The diameter range of the inner center or nucleus is from about 0.200" (about 5 mm) to a maximum of about 0.830" (21 mm), more preferably from about 0.300" (about 7.6 mm) to about 0.380" (about 9.65 mm). The most preferred diameter is $^{11}/_{32}$", or 0.340" to 0.344".

The density of the most preferred 0.340" to 0.344" center is less than about 20 grams/cc, preferably less than 12 grams/cc and most preferably less than 8 grams/cc. The density is set so that it will not exceed the U.S.G.A. golf ball weight requirement. These and other objects and features of the invention will be apparent from the following description and from the claims.

BRIEF DESCRIPTION OF THE DRAWINGS

The following is a brief description of the drawings, which are presented for the purposes of illustrating the invention and not for the purposes of limiting the same.

DETAILED DESCRIPTION OF THE PREFERRED EMBODIMENTS

Figure 1:
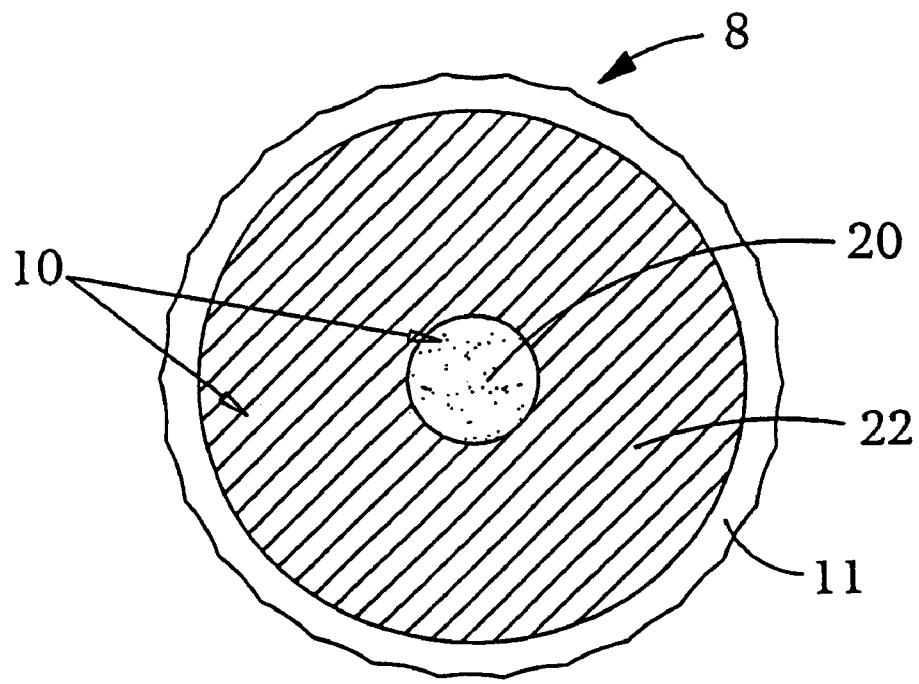
FIG. 1 is a cross-sectional view of a golf ball in accordance with the present invention comprising a dual core component having a relatively small, high density spherical center comprising a powdered metal or other high density filler material dispersed in a first matrix material comprising polybutadiene and polyisoprene rubbers, a relatively thick outer core layer comprising a second matrix material selected from thermosets, thermoplastics, or a combination thereof, and a single-layered cover.

The present invention is directed to improved solid, non-wound, golf balls comprising a polymeric core component with a high density center, or nucleus, and one or more outer core layers and a polymeric cover component with either a single or multi-layer cover. The golf balls of the present invention can be of standard or enlarged size. The balls possess a desired combination of properties, including a high coefficient of restitution (C.O.R.), a low moment of inertia, good sound (click) and feel, and a high spin rate on short iron shots.

In this regard, the moment of inertia, sometimes designated "MOI" herein, for the golf balls of the present invention is defined as the sum of the products formed by multiplying the mass of each element by the square of its distance from a specified line or point. This is also known as rotational inertia. Since the present invention golf balls comprise a number of components, the MOI of the resulting golf ball is equal to the sum of the moments of inertia of each of its various components, taken about the same axis or point. All of the moments of inertia of golf balls referred to herein are with respect to, or are taken with regard to, the geometric center of the golf ball.

The term or designation "2×2" or "2×2 construction" as used herein refers to a golf ball construction utilizing two central core components, e.g. a central core component and a core layer disposed about the core component, and two cover components, e.g. a first inner cover layer and a second outer cover layer. The present invention however is not limited to 2×2 configurations and includes 2×1 (two core components and a single cover component), 3×2 (three core components and two cover components), 2×3 configurations (two core components and three cover components), 3×3 configurations (three core components and three cover components), and additional configurations such as 4×2, 4×3, 4×4, 2×4, 3×4, . . . etc.

The term "density reducing filler" as used herein refers to materials having relatively low densities, i.e. that are lightweight or have a specific gravity less than the specific gravity of the base polybutadiene rubber of 0.91. Examples of these materials include lightweight filler materials typically used to reduce the weight of a product in which they are incorporated. Specific examples include, for instance, foams and other materials having a relatively large void volume. Typically, such filler materials have specific gravities less than 1.0.

The golf balls of the present invention utilize a unique dual or multi-component core configuration. Preferably, the core comprises (i) an interior spherical center component formed from a blend including a high density filler material and a first matrix material comprising polybutadiene and polyisoprene and (ii) a core layer disposed about the spherical center component, the core layer formed from a second matrix material such as a thermoset material, a thermoplastic material, or combinations thereof. The cores may further comprise (iii) an optional outer core layer disposed about the core layer. The outer core layer may be formed from a third matrix material such as a thermoset material, a thermoplastic material, or combinations thereof. The first, second or third matrix materials can be of the same or different materials.

The high density center has a specific gravity of greater than 1.2 to about 20.0, and preferably about 4.0 to 18.0, most preferably, 7.6–7.8 for a 0.340" to 0.344" center. The weight of the remaining components is adjusted so that the ball will not exceed the U.S.G.A. golf ball weight requirement.

In this regard, the present invention is directed to golf balls comprising a dual core component having a small, high density spherical center comprising a powdered heavy metal filler or other high density filler material. These fillers have a specific gravity of 2.7 or more, preferably 7–8 or more, and most preferably 19.35. The high density filler is dispersed in a first matrix material selected from thermosets, thermoplastics, and combinations thereof.

Preferably, the blend of the high density metal filler materials and the first matrix material fails to contain any metal carboxylate cross-linking agents (i.e., metal salts of unsaturated fatty acids) such as zinc diacrylate (ZDA) or zinc dimethyl acrylate (ZDMA).

A thick outer core layer is then disposed about the spherical center. The outer core layer comprises a second matrix material selected from thermosets, thermoplastics, and combinations thereof. The outer diameter of the core is from about 1.25" to 1.60", and most preferably, 1.47" to 1.56". A cover comprising one or more layers is subsequently molded about the dual core component to form a solid, non-wound golf ball.

In a particularly preferred form of the present invention, the golf ball comprises a dual core assembly that includes a relatively small but heavy spherical center component, a thick but light core layer disposed about the spherical center component, and a cover assembly disposed about the dual core assembly. The heavy center of the core comprises (i) a polymeric material selected from one or more thermoset materials, thermoplastic materials or combinations thereof, and (ii) one or more heavy weight powdered metals having a specific gravity of 2.7 or more dispersed throughout the polymeric material. Preferably, the heavy center core is comprised of a blend of polybutadiene and polyisoprene.

The cover assembly may include a single cover or a multi-layered cover configuration. Preferably, the novel multi-layer golf ball covers of the present invention include a first or inner layer or ply of a high acid (greater than 16 weight percent acid) ionomer blend or a low acid (16 weight percent acid or less) ionomer blend and second or outer layer or ply comprised of a comparatively softer, low modulus ionomer, ionomer blend or other non-ionomeric thermoplastic or thermosetting elastomer such as polyurethane or polyester elastomer. Most preferably, the inner layer or ply includes a blend of low and/or high acid ionomers and has a Shore D hardness of 58 or greater and the outer cover layer comprised of ionomer or polyurethane and has a Shore D hardness of at least 1 point softer than the inner layer. Separately, the inner and outer cover layers are very thin (i.e., about 0.050" or less in thickness) in construction. More preferably, the cover layers are less than 0.045 inches in thickness and most preferably about 0.040 inches in thickness.

Although the present invention is primarily directed to solid, non-wound, golf balls comprising a dual core component and a multi-layer cover as described herein, the present invention also includes golf balls having a dual core component and conventional covers comprising ionomer, balata, various thermoplastic polyurethanes, cast polyurethanes, or any other cover materials capable of being crosslinked via radiation after cover molding.

Accordingly, the present invention is directed to golf balls having a dual-core configuration and a single or multi-layer cover which produces, upon molding each layer around a high density inner center, a golf ball exhibiting enhanced spin and feel (i.e., lower compression) without adversely affecting the ball's resiliency (i.e., distance) and/or durability (i.e., cut resistance, scuff resistance, etc.) characteristics.

Figure 2:
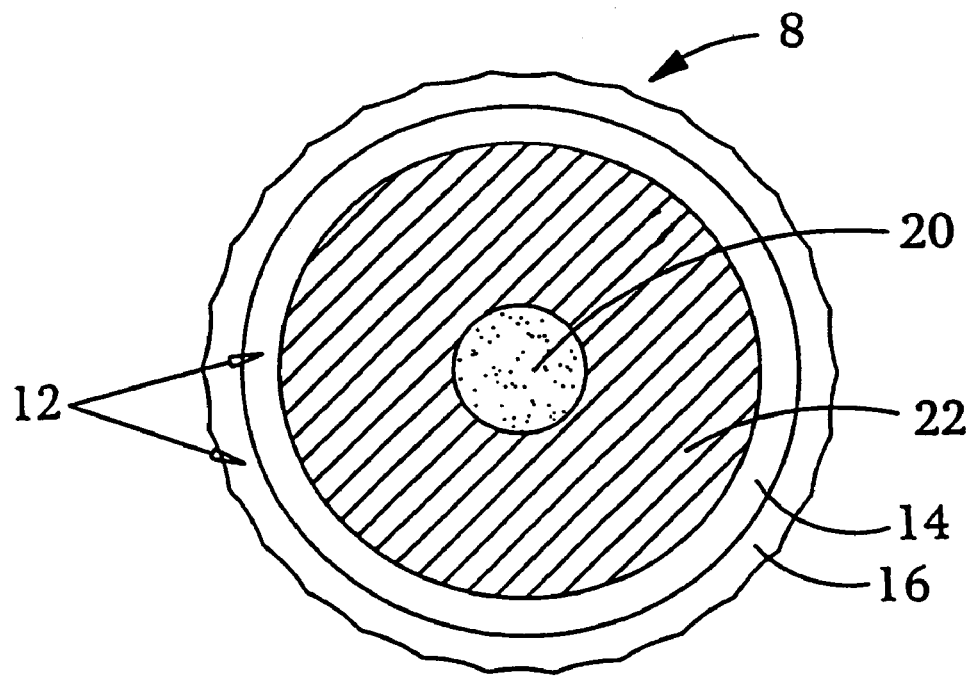
FIG. 2 is a cross-sectional view of yet another embodiment golf ball in accordance with the present invention comprising a dual core component having a relatively small, high density spherical center comprising a powdered metal or other high density filler material dispersed in a first matrix material comprising polybutadiene and polyisoprene synthetic rubbers, a relatively thick outer core layer comprising a second matrix material selected from thermosets, thermoplastics, or a combination thereof, an inner cover layer and an outer cover layer.

FIGS. 1 and 2 illustrate preferred embodiments of the golf balls in accordance with the present invention. It will be understood that all of the figures referenced herein are schematic in nature and none of the referenced figures are to scale. And so, the thicknesses and proportions of the various layers and the diameter of the various core components are not necessarily as depicted.

The golf ball 8 comprises a single layer 11 (FIG. 1) or a multi-layered cover 12 (FIG. 2) disposed about a core 10. The core 10 of the golf ball is formed (FIG. 2) of a small, high density spherical or center core layer center 20 and a thick, low density outer core layer 22. The high density spherical center 20 is designed to produce a low moment of inertia. This results, in part, in higher spin.

The multi-layered cover 12 (FIG. 2) comprises two layers: a first or inner layer or ply 14 and a second or outer layer or ply 16. The inner layer 14 can be ionomer, ionomer blends, non-ionomer, non-ionomer blends, or blends of ionomer and non-ionomer. The outer layer 16 is softer than the inner layer and can be ionomer, ionomer blends, non-ionomer, non-ionomer blends or blends of ionomer and non-ionomer.

In a first multi-layered cover embodiment, the inner layer 14 is comprised of a high acid (i.e. greater than 16 weight percent acid) ionomer resin or high acid ionomer blend. Preferably, the inner layer is comprised of a blend of two or more high acid (i.e., at least 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

In a second multi-layered cover embodiment, the inner layer 14 is comprised of a low acid (i.e., 16 weight percent acid or less) ionomer blend. Preferably, the inner layer is comprised of a blend of two or more low acid (i.e., 16 weight percent acid or less) ionomer resins neutralized to various extents by different metal cations. The inner cover layer may or may not include a metal stearate (e.g., zinc stearate) or other metal fatty acid salt.

It has been found that a hard inner layer in the multi-cover embodiment provides for a substantial increase in resilience (i.e., enhanced distance) over known multi-layer covered balls. The softer outer layer along with the particular multi-component core of the present invention provides the desirable "feel" and high spin rate characteristic while maintaining the golf ball's resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability.

Consequently, the overall combination of the high density inner center, one or more outer core layers and the inner and outer cover layers results in a golf ball having enhanced resilience (improved travel distance) and durability (i.e., cut resistance, etc.) characteristics while maintaining, and in some instances, improving the playability properties of the ball.

The specific components and characteristics of the solid, non-wound golf balls of the present invention are more particularly set forth below.

Core Assembly

As noted, the present invention golf balls utilize a unique dual core configuration. Preferably, the cores comprise (i) an interior, high density, spherical center or center core layer component formed from a first matrix material comprised of thermoset material, thermoplastic material, or combinations thereof and (ii) an outer core layer disposed about the spherical center component, the core layer being formed from a second matrix material comprised of thermoset material, thermoplastic material, or combinations thereof. Preferably the first matrix material is a blend of polybutadiene and polyisoprene.

The spherical center component further comprises a blend of one or more heavy weight metals and/or filler materials preferably in particulate or powder form, dispersed throughout the thermoset or thermoplastic material. Preferably, the blend is devoid of any metal carboxylate cross-linking agents.

The outer core layer is disposed immediately adjacent to, and in intimate contact with the center component. Specifically, one or more outer core layer(s) is disposed about the center core layer. Most preferably, the outer core layer(s) is disposed immediately adjacent to, and in intimate contact with, the inner core layer(s). The matrix material of the spherical center and the core layers may be of similar or different composition.

The core layers of the golf balls of the present invention generally are more resilient than that of the cover layers, exhibiting a PGA compression of about 85 or less, preferably about 30 to 85, and more preferably about 40–60.

The core compositions and resulting molded core layers of the present invention are manufactured using relatively conventional techniques. In this regard, the core compositions of the invention preferably are based on a variety of materials, particularly the conventional rubber based materials such as cis-1,4 polybutadiene and mixtures of polybutadiene with other elastomers blended together with crosslinking agents, a free radical initiator, specific gravity controlling fillers and the like. However, the use of metal carboxylate crosslinking agents is preferably not included in the center sphere core layer.

Natural rubber, isoprene rubber, EPR, EPDM, styrene-butadiene rubber, or similar thermoset materials may be appropriately incorporated into the base rubber composition of the butadiene rubber to form the rubber component. It is preferred to use butadiene rubber as a base material of the composition for both the central core layer and the outer core layer. Thus, the same rubber composition, including the rubber base, free radical initiator, and modifying ingredients, except for the specific gravity controlling filler and crosslinking agent, can be used in both the central and outer core layers. However, different compositions can readily be used in the different layers, including thermoplastic materials such as a thermoplastic elastomer or a thermoplastic rubber, or a thermoset rubber or thermoset elastomer material.

Some examples of materials suitable for use as an outer core layer include the above materials as well as polyether or polyester thermoplastic urethanes, thermoset polyurethanes or metallocene polymers or blends thereof. For example, suitable metallocene polymers include foams of thermoplastic elastomers based on metallocene single site catalyst based foams. Such metallocene based foam resins are commercially available and are readily suitable for forming the outer core layer.

Examples of a thermoset material include a rubber based, castable urethane or a silicone rubber. The silicone elastomer may be any thermoset or thermoplastic polymer comprising, at least partially, a silicone backbone. Preferably, the polymer is thermoset and is produced by intermolecular condensation of silanols. A typical example is a polydimethylsiloxane crosslinked by free radical initiators, or by the crosslinking of vinyl or allyl groups attached to the silicone through reaction with silyihydride groups, or via reactive end groups. The silicone may include a reinforcing or non-reinforcing filler. Additionally, the present invention also contemplates the use of a polymeric foam material, such as the metallocene based foamed resin for the outer core layers.

More particularly, a wide array of thermoset materials can be utilized in the core components of the present invention. Examples of suitable thermoset materials include polybutadiene, polyisoprene, styrene/butadiene, ethylene propylene diene terpolymers, natural rubber polyolefins, polyurethanes, silicones, polyureas, or virtually any irreversibly cross-linkable resin system. It is also contemplated that epoxy, phenolic, and an array of unsaturated polyester resins could be utilized.

The thermoplastic material utilized in the present invention golf balls and, particularly their dual cores, may be nearly any thermoplastic material. Examples of typical thermoplastic materials for incorporation in the golf balls of the present invention include, but are not limited to, ionomers, polyurethane thermoplastic elastomers, and combinations thereof. It is also contemplated that a wide array of other thermoplastic materials could be utilized, such as polysulfones, polyamide-imides, polyarylates, polyaryletherketones, polyaryl sulfones/polyether sulfones, polyether-imides, polyimides, liquid crystal polymers, polyphenylene sulfides; and specialty high-performance resins, which would include fluoropolymers, polybenzimidazole, and ultrahigh molecular weight polyethylenes.

Additional examples of suitable thermoplastics include metallocenes, polyvinyl chlorides, polyvinyl acetates, acrylonitrile-butadiene-styrenes, acrylics, styrene-acrylonitriles, styrene-maleic anhydrides, polyamides (nylons), polycarbonates, polybutylene terephthalates, polyethylene terephthalates, polyphenylene ethers/polyphenylene oxides, reinforced polypropylenes, and high-impact polystyrenes.

Preferably, the thermoplastic materials have relatively high melting points, such as a melting point of at least about 300° F. Several examples of these preferred thermoplastic materials and which are commercially available include, but are not limited to, Capron™ (a blend of nylon and ionomer), Lexan™ polycarbonate, Pebax™, and Hytrel™. The polymers or resin system may be cross-linked by a variety of means such as by peroxide agents, sulphur agents, radiation or other cross-linking techniques, if applicable. However, the use of peroxide crosslinking agents is generally preferred in the present invention.

Any or all of the previously described components in the cores of the golf ball of the present invention may be formed in such a manner, or have suitable fillers added, so that their resulting density is decreased or increased. For example, heavy weight metals and/or filler materials are incorporated into the inner spherical center. This is discussed in more detail below.

Additionally, the outer core layers are formed or otherwise produced to be light in weight. For instance, the components could be foamed, either separately or in-situ. Related to this, a foamed light weight filler agent or density reducing filler may also be added to the outer core layers.

The specially produced core components of the present invention are manufactured using relatively conventional techniques. In this regard, the preferred core compositions (i.e., center, core layer, outer core layer, etc.) of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers such as polyisoprene may also be utilized. Most preferably, cis-polybutadiene having a weight-average molecular weight of from about 100,000 to about 500,000 is employed. Along this line, it has been found that the combination of a high cis-polybutadiene manufactured and sold by Dow France 13131 Berre I'Etang Cedex, France, tradename Cariflex BR-1220, and a polyisoprene available from The Goodyear Tire & Rubber Co., Akron, Ohio, under the designation "Natsyn™ 2200" is particularly well suited.

Although the use of metal carboxylate crosslinking agents is not preferred for the center core layer, these crosslinkers are included in the additional outer core layers. The unsaturated carboxylic acid component of the core composition (a co-crosslinking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 12 to about 40, and preferably from about 15 to about 35 parts by weight of the carboxylic acid salt, such as zinc diacrylate, is included in the outer core layers. The unsaturated carboxylic acids and metal salts thereof are generally soluble in the elastomeric base, or are readily dispersed.

The free radical initiator included in the core compositions is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.5 to about 4.0 and preferably in amounts of from about 1.0 to about 3.0 parts by weight per each 100 parts of elastomer and based on 40% active peroxide with 60% inert filler.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy-2,5 dimethyl hexane and the like, as well as mixtures thereof. It will be understood that the total amount of initiators used will vary depending on the specific end product desired and the particular initiators employed.

Examples of such commercially available peroxides are Luperco™ 230 or 231 XL sold by Atochem, Lucidol Division, Buffalo, N.Y., and Trigonox™ 17/40 or 29/40 sold by Akzo Chemie America, Chicago, Ill. In this regard Luperco™ 230 XL and Trigonox™ 17/40 are comprised of n-butyl 4,4-bis (butylperoxy) valerate; and, Luperco™ 231 XL and Trigonox™ 14/40 are comprised of 1,1-bis(t-butylperoxy)-3,3,5-trimethyl cyclohexane. The one-hour half-life of Luperco™ 231 XL is about 112° C., and the one hour half life of Trigonox™ 17/40 is about 129° C. Trigonox™ 42-40 B is preferred and is chemically tert-Butyl peroxy-3,5,5, trimethyl hexanoate.

The core compositions of the present invention may additionally contain any other suitable and compatible modifying ingredients including, but not limited to, metal oxides, fatty acids, and diisocyanates and polypropylene powder resin. For example, Papi™ 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is too hard (i.e. exhibits low compression) and thus allows for a reduction in the amount of crosslinking agent utilized to soften the core to a normal or below normal compression.

Furthermore, because polypropylene powder resin can be added to the core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene, powder per each 100 parts of elastomer are included in the present invention.

Various activators may also be included in the compositions of the present invention. For example, zinc oxide, calcium oxide and/or magnesium oxide are activators for the polybutadiene. The activator can range from about 2 to about 30 parts by weight per 100 parts by weight of the rubbers (phr) component.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

It is preferred that the core compositions include zinc stearate as the metallic salt of a fatty acid in an amount of from about 2 to about 20 parts by weight per 100 parts of rubber.

Diisocyanates may also be optionally included in the core compositions. The diisocyanates act here as moisture scavengers. When utilized, the dioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The preferred core components of the invention are generally comprised of 100 parts by weight of a base elastomer (or rubber) selected from polybutadiene and mixtures of polybutadiene with other elastomers, such as polyisoprene, 12 to 40 parts by weight of at least one metallic salt of an unsaturated carboxylic acid, and 0.5 to 4.0 parts by weight of a free radical initiator (40% active peroxide). However, as mentioned above, the use of at least one metallic salt of an unsaturated carboxylic acid is preferably not included in the formulation of the high density center core layer.

In addition to polybutadiene, the following commercially available thermoplastic resins are also particularly suitable for use in the noted dual cores employed in the golf balls of the present invention: Capron™ 8351 (available from Allied Signal Plastics), Lexan™ ML5776 (from General Electric), Pebax™ 3533 (a polyether block amide from Elf Atochem), and Hytrel™ G4074 (a polyether ester from DuPont). Properties of these four thermoplastics are set forth below in Table 1.

TABLE 1

| | CAPRON™ 8351 | | |
|---|---|---|---|
| | DAM | 50% RH | ASTM Test |
| MECHANICAL | | | |
| Tensile Strength, Yield, psi (MPa) | 7,800 (54) | — | D-638 |
| Flexural Strength, psi (MPa) | 9,500 (65) | — | D-790 |
| Flexural Modulus, psi (MPa) | 230,000 (1,585) | — | D-790 |
| Ultimate Elongation, % | 200 | — | D-638 |
| Notched Izod Impact, ft-lbs/in (J/M) | No Break | — | D-256 |
| Drop Weight Impact, ft-lbs (J) | 150 (200) | — | D-3029 |
| Drop Weight Impact, @ −40° F., ft-lbs (J) | 150 (200) | — | D-3029 |
| PHYSICAL | | | |
| Specific Gravity | 1.07 | — | D-792 |
| THERMAL | | | |
| Melting Point, ° F. (° C.) | 420 (215) | — | D-789 |
| Heat Deflection @ 264 psi ° F. (° C.) | 140 (60) | — | D-648 |

TABLE 1-continued

Lexan™ ML5776

| PROPERTY | TYPICAL DATA | UNIT | METHOD |
|---|---|---|---|
| MECHANICAL | | | |
| Tensile Strength, yield, Type I, 0.125" | 8500 | psi | ASTM D 638 |
| Tensile Strength, break, Type I, 0.125" | 9500 | psi | ASTM D 638 |
| Tensile Elongation, yield, Type I, 0.125" | 110.0 | % | ASTM D 638 |
| Flexural Strength, yield, 0.125" | 12000 | psi | ASTM D 790 |
| Flexural Modulus, 0.125" | 310000 | psi | ASTM D 790 |
| IMPACT | | | |
| Izod Impact, unnotched, 73 F. | 60.0 | ft-lb/in | ASTM D 4812 |
| Izod Impact, notched, 73 F. | 15.5 | ft-lb/in | ASTM D 256 |
| Izod Impact, notches 73 F., 0.250" | 12.0 | ft-lb/in | ASTM D 256 |
| Instrumented Impact Energy @ Peak, 73 F. | 48.0 | ft-lbs | ASTM D 3763 |
| THERMAL | | | |
| HDT, 264 psi, 0.250", unannealed | 257 | deg F. | ASTM D 648 |
| Thermal Index, Elec Prop | 80 | deg C. | UL 7468 |
| Thermal Index, Mech Prop with Impact | 80 | deg C. | UL 7468 |
| Thermal Index, Mech Prop without Impact | 80 | deg C. | UL 7468 |
| PHYSICAL | | | |
| Specific Gravity, solid | 1.19 | — | ASTM D 792 |
| Water Absorption, 24 hours @ 73 F. | 0.150 | % | ASTM D 570 |
| Mold Shrinkage, flow, 0.125" | 5.7 | in/in E-3 | ASTM D 955 |
| Melt Flow Rate, nom = I, 300 C/1.2 kgf(0) | 7.5 | g/10 min | ASTM D 1238 |
| FLAME CHARACTERISTICS | | | |
| UL File Number, USA | E121562 | — | — |
| 94HB Rated (tested thickness) | 0.060 | inch | UL94 |

PEBAX™ RESINS

| PROPERTY | ASTM TEST METHOD | UNITS | 3533 |
|---|---|---|---|
| Specific Gravity | D792 | | |
| Water Absorption Equilibrium (20° C., 50% R.H.>) | | | 0.5 |
| 24 Hr. Immersion | D570 | | 1.2 |
| Hardness | D2240 | | 35D |
| Tensile Strength, Ultimate | D638 | psi | 5600 |
| Elongation, Ultimate | D638 | % | 580 |
| Flexural Modulus | D790 | psi | 2800 |
| Izod Impact, Notched 20° C. | D256 | ft-lb./in. | NB |
| −40° C. | | | NB |
| Abrasion Resistance H18/1000 g | D1044 | Mg/1000104 Cycles | |
| Tear Resistance Notched | D624C | lb./in. | 260 |
| Melting Point | D3418 | ° F. | 306 |
| Vicat Softening Point | D1525 | ° F. | 165 |
| HDT 66 psi | D648 | ° F. | 115 |
| Compression Set (24 hr., 160° F.) | D395A | % | 54 |

HYTREL™ G4074
Thermoplastic Elastomer

| PHYSICAL | | | |
|---|---|---|---|
| Dens/Sp Gr | ASTM D792 | 1.1800 | sp gr 23/23 C. |
| Melt Flow | ASTM D1238 | 5.20 @° −190 C./2.16 kg | g/10/min |
| Wat Abs | ASTM D570 | | 2.100% |
| MECHANICAL | | | |
| Elong@Brk | ASTM D638 | | 230.0% |
| Flex Mod | ASTM D790 | | 9500 psi |
| TnStr@Brk | ASTM D638 | | 2000 psi |
| IMPACT | | | |
| Notch Izod | ASTM D256 | No Break @ 73.0 F. @ 0.2500 inft-lb/in 0.50 @ −40.0 F. @0.2500 inft-lb/in | |
| HARDNESS | | | |
| Shore | ASTM D2240 | | 40 Shore D |
| THERMAL | | | |
| DTUL@66 | ASTM D648 | | 122 F. |
| Melt Point | | | 338.0 F. |
| Vicat Soft Melt Point | ASTM D1525 | | 248 F. |

In addition, various polyisoprenes may also be included in the core components of the present invention. Examples of such polyisoprenes are as follows:

| TRADENAME Composition Supplier | ELASTOMER PROPERTIES Compounding & Processing |
|---|---|
| Isolene Depolymerized synthetic polyisoprene Hardman | Sp. gr. 0.92. Ash, 0.5–1.2%. Volatile matter, 0.1% (24 hour at 300° F.), 100% rubber (flowable form). Grades: Isolene-40 (40,00 cps @ 100° F.; Mol wt. mw 40,000); Isolene-75 (75,000 cps @ 100° F.); DPR-400 viscosity (400,000 @ 100° F., mol wt. mw 40,000). Gardner color (60–8) |
| Natsyn 2200 Goodyear R. T. Vanderbilt | Sp. gr. 0.91. White, non-staining, solution polymerized, IR with excellent uniformity and purity. Vulcanized with conventional cure systems, Mooney visc (ml-4 @ 212° F.). 70–90, needs little or no breakdown. Tg. 98° F. |
| Natsyn 2205 DuPont R. T. Vanderbilt | Sp. gr. 0.91. White, non-staining, virtually gel free solution polymerized IR. Mooney viscosity (ml-4 @ 212° F.). 70–90, needs little or no breakdown. Tg. 98° F. |
| Natsyn 2210 | Sp. gr. 0.91. White, non-staining, low Mooney, solution |

-continued

| TRADENAME Composition Supplier | ELASTOMER PROPERTIES Compounding & Processing |
|---|---|
| DuPont R. T. Vanderbilt | polymerized, IR with excellent uniformity and purity. Vulcanized with conventional cure systems, Mooney visc (ml-4 @ 212° F.) 50–65, therefore no breakdown is required. Tg-98°. |
| Nipol IR 2200L Goldsmith & Eggleton | Sp. gr. 0.92, Mooney visc. ml-4 at 100° C. 70, Cis 1,498%. non-staining. |
| SKI-3 Polyisoprene H. A. Astlett | Staining IR: 97.5 cis 1,4; Mooney viscosity, density 91.55. |
| SKI-3 Isoprene Rubber Nizh USA | Mooney visc. MB 1 = 4 (100° C.) 65–85; Plasticity 0.30–0.41: ultimate elongation, % min. 800; Ultimate tensile strength MPa (kgF/sq.cm.) min at 23° C. 30.4 at 100° C. 21.6. |
| SKI-3 (Russian IR) Polyisoprene Alcan | Staining IR, 97.5 cis 1,4.60 Mooney viscosity, density 91.55. |
| SKI-3-S Polyisoprene H. A. Astlett | Non-staining 97.5 cis 1,4 73 7 Mooney viscosity, density 91.55. |
| SKI-3-S (Russian IR) Polyisoprene Alcan | Non-staining 97.5 cis 1,4 73 7 Mooney viscosity, density 91.55. |

The inner spherical center preferably can be compression or transfer molded from an uncured or lightly cured elastomer composition. To achieve higher coefficients of restitution and/or to increase hardness in the core, the manufacturer may include a small amount of a metal oxide such as zinc oxide. Non-limiting examples of other materials which may be used in the core composition including compatible rubbers or ionomers, and low molecular weight fatty acids such as stearic acid. Free radical initiator catalysts such as peroxides are admixed with the core composition so that on the application of heat and pressure, a curing or cross-linking reaction takes place.

Also included in the matrix materials of the inner spherical centers, are one or more heavy weight fillers or powder materials. Such an inner spherical center exhibits a lower moment of inertia than conventional two-piece golf balls. The moment of inertia for the present golf ball is less than 0.45 oz.in$^2$ and more preferably less than 0.44 oz.in$^2$. Most preferably, the moment of inertia for the golf ball of the present invention is less than 0.43 oz.in$^2$.

The powdered metal in the spherical center may be in a wide array of types, geometries, forms, and sizes. The powdered metal may be of any shape so long as the metal may be blended with the other components which form the spherical center.

Particularly, the metal may be in the form of metal particles, metal flakes, and mixtures thereof. However, again, the forms of powdered metal are not limited to such forms. The metal may be in a form having a variety of sizes so long as the objectives of the present invention are maintained. Preferably, the powdered metal is incorporated into the matrix material of the spherical center in finely defined form, as for example, in a size generally less than about 20 mesh, preferably less than about 200 mesh and most preferably less than about 325 mesh, U.S. standard size. The amount of powdered metal included in the spherical center is dictated by weight restrictions, the type of powdered metal, and the overall characteristics of the finished ball. However, the amount of powdered metal is generally from about 100 to about 3200 parts by weight matrix material, more preferably, from about 500 to about 1500 matrix material and most preferably from about 1200 to 1400 matrix material for a 0.340" diameter polybutadiene center.

The spherical center may include more than one type of powdered metal. Particularly, the spherical center may include blends of the powdered metals disclosed in Table 2 below. The blends of powdered metals may be in any proportion with respect to each other in order for the spherical center and golf ball to exhibit the characteristics noted herein.

In this regard, the weight of the inner spherical core component is increased in the present invention through the inclusion of 100–3200 parts per hundred parts matrix material of metal particles and other heavy weight filler materials. As used herein, the term "heavy weight filler materials" is defined as any material having a specific gravity greater than 2.7. Preferably, the particles (or flakes, fragments, fibers, etc.) of powdered metal are added to the inner spherical core in order to decrease the moment of inertia of the ball without affecting the ball's feel and durability characteristics.

The inner spherical core is filled with one or more reinforcing or non-reinforcing heavy weight fillers such as metal (or metal alloy) powders. Representatives of such metal (or metal alloy) powders include but are not limited to, tungsten powder, bismuth powder, boron powder, brass powder, bronze powder, cobalt powder, copper powder, inconnel metal powder, iron metal powder, molybdenum powder, nickel powder, stainless steel powder, titanium metal powder, zirconium oxide powder, aluminum flakes, and aluminum tadpoles.

Examples of several suitable powdered metals which can be included in the present invention are as follows:

TABLE 2

| Metals and Alloys (Powders) | Specific Gravity |
|---|---|
| titanium | 4.51 |
| tungsten | 19.35 |
| bismuth | 9.78 |
| nickel | 8.90 |
| molybdenum | 10.2 |
| iron | 7.86 |

TABLE 2-continued

| Metals and Alloys (Powders) | Specific Gravity |
|---|---|
| copper | 8.94 |
| brass | 8.2–8.4 |
| bronze | 8.70–8.74 |
| cobalt | 8.92 |
| zinc | 7.14 |
| tin | 7.31 |
| aluminum | 2.70 |

The amount and type of powdered metal utilized is dependent upon the overall characteristics of the high spinning, soft feeling, golf ball desired. Generally, lesser amounts of high specific gravity powdered metals are necessary to produce a decrease in the moment of inertia in comparison to low specific gravity materials. Furthermore, handling and processing conditions can also effect the type of heavy weight powdered metals incorporated into the spherical center. In this regard, Applicants have found that the inclusion of approximately 1200–1400 phr tungsten powder into the inner spherical center produces the desired increase in the moment of inertia without involving substantial processing changes. Thus, 1200–1400 phr tungsten powder is the most preferred heavy filler material at the time of this writing for a 0.340" diameter polybutadiene center or nucleus.

Furthermore, powdered iron can also be preferably blended with powdered tungsten or other powdered materials in the spherical center so that the spherical center can be attracted to a magnet. The magnetic attraction allows for automated assembly of the spherical center to the remaining layers in forming the golf ball. Preferably, the powdered iron is about 4–10% by weight of the spherical center composition when used as an attraction agent for a magnet.

The powdered metal constitutes at least 50% by weight of the total spherical center composition. Preferably, the powdered metal constitutes at least 60% of the spherical center composition. Most preferably, the powdered metal constitutes at least 70% of the spherical center composition.

When the preferred high density powdered metal comprises the spherical center, the diameter of the spherical center can vary considerably so long as the maximum U.S.G.A. golf ball weight is not exceeded. Preferably, the spherical center has a diameter in the range of about 0.200 inches to about 0.830 inches. More preferably, the diameter of the spherical center is from about 0.200 inches to about 0.400 inches, most preferably from about 0.300 inches to about 0.380 inches, with 0.340–0.344 inches being optimal.

The spherical center comprising a high density powdered metal has a density that will not exceed the U.S.G.A. golf ball weight requirement. Preferably, the density is no more than about 12–20, preferably less than 9 grams/cm$^3$ for a 0.340"–0.344" diameter nucleus.

The outer diameter of the center core and the outer diameter of the outer core (core diameter) may vary. However, the center core has a diameter of about 5 to 21 mm and preferably about 5 to 15 mm while the outer core has a diameter of about 30 to 40 mm and preferably 35 to 38 mm, depending on the size of the center core and the finished size of the ball. Typically the center core diameter is about 5 to 12 mm.

The core having a two-layer structure composed of the inner core and the outer core is referred to as the solid core in the present invention. The above expression is in contrast to a thread-wound core (core formed by winding a rubber thread around the center portion which is solid or filled with a liquid material).

The double cores of the inventive golf balls typically have a coefficient of restitution of about 0.730 or more, more preferably 0.770 or more and a PGA compression of about 95 or less, and more preferably 70 or less. The double cores have a weight of 25 to 40 grams and preferably 30 to 40 grams and a Shore C hardness of less than 80, with the preferred Shore C hardness being about 50 to 75.

As mentioned above, the present invention includes golf ball embodiments that utilize two or more core components. For example, in accordance with the present invention, a core assembly is provided that comprises a central core component and one or more core layers disposed about the central core component. Details for the second and third or more core layers are also included herein in the description of the core layer utilized in a dual core configuration.

In producing golf ball centers utilizing the present compositions, the ingredients may be intimately mixed using, for instance, two roll mills or a Banbury™ mixer until the composition is uniform, usually over a period of from about 5 to about 20 minutes. The sequence of addition of components is not critical. A preferred blending sequence is described below.

The matrix material or elastomer, powdered metal zinc salt (if desired), the high specific gravity additive such as powdered metal, metal oxide, fatty acid, and the metallic dithiocarbamate (if desired), surfactant (if desired), and tin difatty acid (if desired), are blended for about 7 minutes in an internal mixer such as a Banbury™ mixer. As a result of shear during mixing, the temperature rises to about 200° F. The mixing is desirably conducted in such a manner that the composition does not reach incipient polymerization temperatures during the blending of the various components. The initiator and diisocyanate are then added and the mixing continued until the temperature reaches about 220° F. whereupon the batch is discharged onto a two-roll mill, mixed for about one minute and sheeted out.

The sheet is rolled into a "pig" and then placed in a Barwell™ preformer and slugs of the desired weight are produced. The slugs to be used for the center core layer are then subjected to compression molding at about 140° C. to about 170° C. for about 10 to 50 minutes. Note that the temperature in the molding process is not always required to be constant, and may be changed in two or more steps. In fact, the slugs for the outer core layer are frequently preheated for about one half hour at about 75° C. prior to molding. After molding, the molded centers are cooled, the cooling effected at room temperature for about 4 hours or in cold water for about one hour. The molded centers are subjected to a centerless grinding operation whereby a thin layer of the molded core is removed to produce a round center. Alternatively, the centers are used in the as-molded state with no grinding needed to achieve roundness.

The solid inner centers are generally from 0.200 to 0.830 inches in diameter, preferably 0.300 to 0.380 inches, and most preferably 0.320 to 0.360 inches, with a weight of 1.2 grams to 5.9 grams, preferably 1.8 to 3.6 grams, and most preferably 2.6 to 3.0 grams for a 0.340"–0.344" diameter nucleus. The specific gravity of the inner spherical center is from 1.2 to 20.0, preferably 5 to 12, and most preferably 7.6 to 7.9 for a 0.340"–0.344" diameter nucleus.

The center is converted into a dual core by providing at least one layer of core material thereon, ranging in thickness from about 0.69 to about 0.38 inches and preferably from about 0.65 to about 0.60 inches. The outer core layers may be of similar or different matrix material as the spherical center. Preferably the outer core layer comprises polybutadiene which has been weight adjusted to compensate for the heavy weight spherical center.

The outer core layer can be applied around the spherical center by several different types of molding processes. For example, the compression molding process for forming the cover layer(s) of a golf ball that is set forth in U.S. Pat. No. 3,819,795 can be adapted for use in producing the core layer(s) of the present invention.

In such a modified process, preforms or slugs of the outer core material, i.e., the thermoset material utilized to form the outer core layer, are placed in the upwardly open, bottom cavities of a lower mold member of a compression molding assembly, such as a conventional golf ball or core platen press. The upwardly facing hemispherical cavities have inside diameters substantially equal to the finished core to be formed. In this regard, the inside diameters of the cavities are slightly larger (i.e., approximately 0.010" diameter) than the desired finished core size in order to account for material shrinkage.

An intermediate mold member comprising a center Teflon™-coated plate having oppositely-affixed hemispherical protrusions extending upwardly on the upper surface and extending downwardly on the lower surface, each hemispherical protrusion about 0.340 inches in diameter, is placed over the lower mold member and on top of the preforms located in the bottom molding cavities. The size and outside diameters of the hemispherical protrusions are substantially equal to the centers to be utilized and thus can vary with the various sizes of the centers to be used.

Additional preforms of the same outer core material are subsequently placed on top of the upperly-projecting 0.340" hemispherical protrusions affixed to the upper surfaces of the Teflon™-coated plate of the intermediate mold member. The additional preforms are then covered by the downwardly open cavities of the top mold member. Again the downward facing cavities of the top mold member have inside diameters substantially equal to the core to be formed.

Specifically, the bottom mold member is engaged with the top mold member with the intermediate mold member having the oppositely protruding hemispheres being present in the middle of the assembly. The mold members are then compressed together to form hemispherical core halves.

In this regard, the mold assembly is placed in a press and cold formed at room temperature using approximately 10 tons of pressure in a steam press. The molding assembly is closed and heated below the cure activation temperature of about 150° F. for approximately four minutes to soften and mold the outer core layer materials. While still under compression, but at the end of the compression cycle, the mold members are water cooled to a temperature to less than 100° F. in order to maintain material integrity for the final molding step. This cooling step is beneficial since cross linking has not yet proceeded to provide internal chemical bonds to provide full material integrity. After cooling, the pressure is released.

The molding assembly is then opened, the upper and lower mold members are separated, and the intermediate mold member is removed while maintaining the formed outer core layer halves in their respective cavities. Each of the halves has an essentially perfectly formed one-half shell cavity or depression in its uncured thermoset material. These one-half shell cavities or depressions were produced by the hemispherical protrusions of the intermediate mold member.

Previously molded centers of about 0.340" in diameter, are then placed into the bottom cavities or depressions of the uncured thermoset material. The top portion of the molding assembly is subsequently engaged with the bottom portion and the material that is disposed therebetween is cured for about 12 minutes at about 320° F. Those of ordinary skill in the art relating to free radical curing agents for polymers are conversant with adjustments of cure times and temperatures required to effect optimum results with any specific free radical agent. The combination of the high temperature and the compression force joins the core halves, and bonds the cores to the center. This process results in a substantially continuously outer core layer being formed around the center component.

In an alternative, and in some instances, more preferable compression molding process, the Teflon™-coated plate of the intermediate mold member has only a set of downwardly projecting hemispherical protrusions and no oppositely affixed upwardly-projecting hemispherical protrusions. Substituted for the upwardly-projecting protrusions are a plurality of hemispherical recesses in the upper surface of the plate. Each recess is located in the upper surface of the plate opposite a protrusion extending downwardly from the lower surface. The recess has an inside diameter substantially equal to the center to be utilized and is configured to receive the bottom half of the center.

The previously molded centers of about 0.340" in diameter are then placed in the cavities located on the upper surface of the plate of the intermediate mold member. Each of the centers extends above the upper surface of the plate of the intermediate mold member and is pressed into the lower surface of the upper preform when the molds are initially brought together during initial compression.

The molds are then separated and the plate removed, with the centers being retained (pressed into) the half shells of the upper preforms. Mating cavities or depressions are also formed in the half shells of the lower preforms by the downwardly projecting protrusions of the intermediate mold member. With the plate now removed, the top portion of the molding assembly is then joined with the bottom portion. In so doing, the centers projecting from the half shells of the upper performs enter into the cavities or depressions formed in the half shells of the lower preforms. The material included in the molds is subsequently compressed, treated and cured as stated above to form a golf ball core having a centrally located center and an outer core layer. This process can continue for additional added core layers.

After molding, the core comprising a centrally located center surrounded by at least one outer core layer is removed from the mold and the surface thereof preferably is treated to facilitate adhesion thereof to the covering materials. Surface treatment can be effected by any of the several techniques known in the art, such as corona discharge, ozone treatment, sand blasting, brush tumbling, and the like. Preferably, surface treatment is effected by grinding with an abrasive wheel.

Cover Assembly

A. Multi-Covers i. Inner Cover Layer

The inner cover layer is harder than the outer cover layer and generally has a thickness in the range of 0.01 to 0.10 inches, preferably 0.03 to 0.07 inches for a 1.68 inch ball and 0.05 to 0.10 inches for a 1.72 inch (or more) ball. The core and inner cover layer together form an inner ball having a coefficient of restitution of 0.780 or more and more preferably 0.790 or more, and a diameter in the range of 1.48–1.64 inches for a 1.68 inch ball and 1.50–1.70 inches for a 1.72 inch (or more) ball. The inner cover layer has a Shore D hardness of 60 or more. It is particularly advantageous if the golf balls of the invention have an inner layer with a Shore D hardness of 65 or more. The above-described characteristics of the inner cover layer provide an inner ball having a PGA compression of 100 or less. It is found that when the inner ball has a PGA compression of 90 or less, excellent playability results.

The inner layer compositions include the high acid ionomers such as those developed by E.I. DuPont de Nemours & Company under the trademark "Surlyn™" and by Exxon Corporation under the trademark "Escor™" or trade name "Iotek", or blends thereof. Examples of compositions which may be used as the inner layer herein are set forth in detail in a continuation of U.S. application Ser. No. 08/174,765, which is a continuation of U.S. application Ser. No. 07/776,803 filed Oct. 15, 1991, and Ser. No. 08/493,089, which is a continuation of Ser. No. 07/981,751, which in turn is a continuation of Ser. No. 07/901,660 filed Jun. 19, 1992, all of which are incorporated herein by reference. Of course, the inner layer high acid ionomer compositions are not limited in any way to those compositions set forth in said applications.

The high acid ionomers which may be suitable for use in formulating the inner layer compositions are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the inner layer cover composition of several embodiments of the present invention preferably includes a high acid ionomeric resin, the scope of the patent embraces all known high acid ionomeric resins falling within the parameters set forth above, only a relatively limited number of these high acid ionomeric resins have recently become commercially available.

The high acid ionomeric resins available from Exxon under the designation "Escor™" and or "Iotek", are somewhat similar to the high acid ionomeric resins available under the "Surlyn™" trademark. However, since the Escor™/Iotek ionomeric resins are sodium or zinc salts of poly(ethylene-acrylic acid) and the "Surlyn™" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn™8220 and 8240 (both formerly known as forms of Surlyn™ AD-8422), Surlyn™9220 (zinc cation), Surlyn™SEP-503-1 (zinc cation), and Surlyn™SEP-503-2 (magnesium cation). According to DuPont, all of these ionomers contain from about 18.5 to about 21.5% by weight methacrylic acid.

More particularly, Surlyn™ AD-8422 is currently commercially available from DuPont in a number of different grades (i.e., AD-8422-2, AD-8422-3, AD-8422-5, etc.) based upon differences in melt index. According to DuPont, Surlyn™ 8422, which is believed recently to have been redesignated as 8220 and 8240, offers the following general properties when compared to Surlyn™ 8920, the stiffest, hardest of all on the low acid grades (referred to as "hard" ionomers in U.S. Pat. No. 4,884,814):

|  | LOW ACID (15 wt % Acid) | HIGH ACID (>20 wt % Acid) | |
|---|---|---|---|
|  | SURLYN ™ 8920 | SURLYN ™ 8422-2 | SURLYN ™ 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP¹, ° C. | 88 | 86 | 85 |
| FP¹, ° C. | 47 | 48.5 | 45 |
| COMPRESSION MOLDING² | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

¹DSC second heat, 10° C./min heating rate.
²Samples compression molded at 150° C. annealed 24 hours at 60° C. 8422-2, -3 were homogenized at 190° C. before molding.

In comparing Surlyn™ 8920 to Surlyn™ 8422-2 and Surlyn™ 8422-3, it is noted that the high acid Surlyn™ 8422-2 and 8422-3 ionomers have a higher tensile yield, lower elongation, slightly higher Shore D hardness and much higher flexural modulus. Surlyn™ 8920 contains 15 weight percent methacrylic acid and is 59% neutralized with sodium.

In addition, Surlyn™SEP-503-1 (zinc cation) and Surlyn™SEP-503-2 (magnesium cation) are high acid zinc and magnesium versions of the Surlyn™AD 8422 high acid ionomers. When compared to the Surlyn™ AD 8422 high acid ionomers, the Surlyn™ SEP-503-1 and SEP-503-2 ionomers can be defined as follows:

| Surlyn ™ Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Further, Surlyn™ 8162 is a zinc cation ionomer resin containing approximately 20% by weight (i.e., 18.5–21.5% weight) methacrylic acid copolymer that has been 30–70% neutralized. Surlyn™ 8162 is currently commercially available from DuPont.

Examples of the high acid acrylic acid based ionomers suitable for use in the present invention also include the Escor™ or Iotek high acid ethylene acrylic acid ionomers produced by Exxon such as Ex 1001, 1002, 959, 960, 989, 990, 1003, 1004, 993, 994. In this regard, Escor™ or Iotek 959 is a sodium ion neutralized ethylene-acrylic neutralized ethylene-acrylic acid copolymer. According to Exxon, Ioteks 959 and 960 contain from about 19.0 to 21.0% by weight acrylic acid with approximately 30 to about 70 percent of the acid groups neutralized with sodium and zinc ions, respectively. The physical properties of these high acid acrylic acid based ionomers are set forth in Tables 3 and 4 as follows:

TABLE 3

Physical Properties of Various Ionomers

| PROPERTY | Ex1001 | Ex1002 | ESCOR ™ (IOTEK) 959 | Ex1003 | Ex1004 | ESCOR ™ (IOTEK) 960 |
|---|---|---|---|---|---|---|
| Melt index, g/10 min | 1.0 | 1.6 | 2.0 | 1.1 | 2.0 | 1.8 |
| Cation | Na | Na | Na | Zn | Zn | Zn |
| Melting Point, °F. | 183 | 183 | 172 | 180 | 180.5 | 174 |
| Vicat Softening Point, °F. | 125 | 125 | 130 | 133 | 131 | 131 |
| Tensile @ Break | 34.4 MPa | 22.5 MPa | 4600 psi | 24.8 MPa | 20.6 MPa | 3500 psi |
| Elongation @ Break, % | 341 | 348 | 325 | 387 | 437 | 430 |
| Hardness, Shore D | 63 | 62 | 66 | 54 | 53 | 57 |
| Flexural Modulus | 365 MPa | 380 MPa | 66,000 psi | 147 MPa | 130 MPa | 27,000 psi |

TABLE 4

Physical Properties of Various Ionomers

|  |  | EX 989 | EX 993 | EX 994 | EX 990 |
|---|---|---|---|---|---|
| Melt index | g/10 min | 1.30 | 1.25 | 1.32 | 1.24 |
| Moisture | ppm | 482 | 214 | 997 | 654 |
| Cation type | — | Na | Li | K | Zn |
| M+ content by AAS | wt % | 2.74 | 0.87 | 4.54 | 0 |
| Zn content by AAS | wt % | 0 | 0 | 0 | 3.16 |
| Density | kg/m³ | 959 | 945 | 976 | 977 |
| Vicat softening point | °C. | 52.5 | 51 | 50 | 55.0 |
| Crystallization point | °C. | 40.1 | 39.8 | 44.9 | 54.4 |
| Melting point | °C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick Rebound | % | 61 | 63 | 59 | 48 |

Furthermore, as a result of the development by the assignee of this application of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially higher C.O.R.'s than those produced by the low acid ionomer inner cover compositions presently commercially available.

More particularly, several new metal cation neutralized high acid ionomer resins have been produced by the assignee by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous new metal cation neutralized high acid ionomer resins can be obtained by reacting a high acid copolymer (i.e., a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e., from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers that fulfill the criteria set forth above, are a series of ethylene-acrylic copolymers, which are commercially available from The Dow Chemical Company, Midland, Mich., under the "Primacor™" designation. These high acid base copolymers exhibit the typical properties set forth below in Table 5.

the quantity which provides a sufficient amount of the metal cations to neutralize the desired percentage of the carboxylic acid groups in the high acid copolymer. The extent of neutralization is generally from about 10% to about 90%.

As indicated below in Table 6 and more specifically in Example 1 in U.S. application Ser. No. 08/493,089, a number of new types of metal cation neutralized high acid ionomers can be obtained from the above indicated process. These include new high acid ionomer resins neutralized to various extends with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium,

TABLE 5

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600–3200 | 40 | 42 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F., under high shear conditions at a pressure of from about 10 psi to 10,000 psi. Other well known blending techniques may also be used. The amount of metal cation salt utilized to produce the new metal cation neutralized high acid based ionomer resins is lithium, zinc, magnesium, manganese, calcium and nickel, several new cation neutralized acrylic acid based high acid ionomer resins are produced.

TABLE 6

Metal Cation Neutralized High Acid Ionomers

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | 0.804 | 71 |
| 2(NaOH) | 5.66 | 54 | 2.4 | 0.808 | 73 |
| 3(NaOH) | 3.84 | 35.9 | 12.2 | 0.812 | 69 |
| 4(NaOH) | 2.91 | 27 | 17.5 | 0.812 | (brittle) |
| 5(MnAc) | 19.6 | 71.7 | 7.5 | 0.809 | 73 |
| 6(MnAc) | 23.1 | 88.3 | 3.5 | 0.814 | 77 |
| 7(MnAc) | 15.3 | 53 | 7.5 | 0.81 | 72 |
| 8(MnAc) | 26.5 | 106 | 0.7 | 0.813 | (brittle) |
| 9(LiOH) | 4.54 | 71.3 | 0.6 | 0.81 | 74 |
| 10(LiOH) | 3.38 | 52.5 | 4.2 | 0.818 | 72 |
| 11(LiOH) | 2.34 | 35.9 | 18.6 | 0.815 | 72 |
| 12(KOH) | 5.3 | 36 | 19.3 | Broke | 70 |
| 13(KOH) | 8.26 | 57.9 | 7.18 | 0.804 | 70 |
| 14(KOH) | 10.7 | 77 | 4.3 | 0.801 | 67 |
| 15(ZnAc) | 17.9 | 71.5 | 0.2 | 0.806 | 71 |
| 16(ZnAc) | 13.9 | 53 | 0.9 | 0.797 | 69 |
| 17(ZnAc) | 9.91 | 36.1 | 3.4 | 0.793 | 67 |
| 18(MgAc) | 17.4 | 70.7 | 2.8 | 0.814 | 74 |
| 19(MgAc) | 20.6 | 87.1 | 1.5 | 0.815 | 76 |
| 20(MgAc) | 13.8 | 53.8 | 4.1 | 0.814 | 74 |
| 21(CaAc) | 13.2 | 69.2 | 1.1 | 0.813 | 74 |
| 22(CaAc) | 7.12 | 34.9 | 10.1 | 0.808 | 70 |

Controls: 50/50 Blend of Ioteks 8000/7030 C.O.R. = .810/65 Shore D Hardness
DuPont High Acid Surlyn ™ 8422 (Na) C.O.R. = .811/70 Shore D Hardness
DuPont High Acid Surlyn ™ 8162 (Zn) C.O.R. = .807/65 Shore D Hardness TABLE 6-continued Metal Cation Neutralized High Acid Ionomers

| Formulation No. | Wt-% Cation Salt | Wt-% Neutralization | Melt Index | C.O.R. | Shore D Hardness |
|---|---|---|---|---|---|
| Exxon High Acid Iotek EX-960 (Zn) C.O.R. = .796/65 Shore D Hardness | | | | | |
| 23(MgO) | 2.91 | 53.5 | 2.5 | 0.813 | |
| 24(MgO) | 3.85 | 71.5 | 2.8 | 0.808 | |
| 25(MgO) | 4.76 | 89.3 | 1.1 | 0.809 | |
| 26(MgO) | 1.96 | 35.7 | 7.5 | 0.815 | |
| Control for Formulations 23–26 is 50/50 Iotek 8000/7030, C.O.R. = .814, Formulation 26 C.O.R. was normalized to that control accordingly | | | | | |
| 27(NiAc) | 13.04 | 61.1 | 0.2 | 0.802 | 71 |
| 28(NiAc) | 10.71 | 48.9 | 0.5 | 0.799 | 72 |
| 29(NiAc) | 8.26 | 36.7 | 1.8 | 0.796 | 69 |
| 30(NiAc) | 5.66 | 24.4 | 7.5 | 0.786 | 64 |
| Control for Formulation Nos. 27–30 is 50/50 Iotek 8000/7030, C.O.R. = .807 | | | | | |

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel further than previously known multi-layered golf balls produced with low acid ionomer resin covers due to the balls' enhanced coefficient of restitution values.

The low acid ionomers which may be suitable for use in formulating the inner layer compositions of several of the embodiments of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are neutralized or partially neutralized (i.e., approximately 10–100%, preferably 30–70%) by the metal ions. Each of the low acid ionomer resins which may be included in the inner layer cover compositions of the invention contains 16% by weight or less of a carboxylic acid.

The inner layer cover compositions include the low acid ionomers such as those developed and sold by E.I. DuPont de Nemours & Company under the trademark "Surlyn™" and by Exxon Corporation under the trademark "Escor™" or tradename "Iotek," or blends thereof.

The low acid ionomer resins available from Exxon under the designation "Escor™" and/or "Iotek," are somewhat similar to the low acid ionomeric resins available under the "Surlyn™" trademark. However, since the Escor™/Iotek ionomeric resins are sodium or zinc salts of poly(ethylene-acrylic acid) and the "Surlyn™" resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e., the inner cover layer herein) the resulting golf balls will travel further and at an enhanced spin rate than previously known multi-layered golf balls. Such an improvement is particularly noticeable in enlarged or oversized golf balls.

The use of an inner layer formulated from blends of lower acid ionomers produces multi-layer golf balls having enhanced compression and spin rates. These are the properties desired by the more skilled golfer.

In yet another embodiment of the inner cover layer, a blend of high and low acid ionomer resins is used. These can be the ionomer resins described above, combined in a weight ratio which preferably is within the range of 10:90 to 90:10 parts of high and low acid ionomer resins.

A further additional embodiment of the inner cover layer is primarily based upon the use of a fully non-ionomeric thermoplastic material. Suitable non-ionomeric materials include metallocene catalyzed polyolefins or polyamides, polyamide/ionomer blends, polyphenylene ether/ionomer blends, etc., which have a shore D hardness of 60 and a flex modulus of greater than about 30,000 psi, or other hardness and flex modulus values which are comparable to the properties of the ionomers described above. Other suitable materials include but are not limited to thermoplastic or thermosetting polyurethanes, a polyester elastomer such as that marketed by DuPont under the trademark Hytrel™ (polyether ester), or a polyether amide such as that marketed by Elf Atochem S.A. under the trademark Pebax™, a blend of two or more non-ionomeric thermoplastic elastomers, or a blend of one or more ionomers and one or more non-ionomeric thermoplastic elastomers.

ii. Outer Cover Layer

While the dual core component described below, and the hard inner cover layer formed thereon, provide the multi-layer golf ball with power and distance, the outer cover layer 16 is comparatively softer than the inner cover layer. The softness provides for the feel and playability characteristics typically associated with balata or balata-blend balls. The outer cover layer or ply is comprised of a relatively soft, low modulus (about 1,000 psi to about 10,100 psi) and, in an alternate embodiment, low acid (less than 16 weight percent acid) ionomer, an ionomer blend, a non-ionomeric thermoplastic or thermosetting material such as, but not limited to, a metallocene catalyzed polyolefin such as EXACT™ material available from EXXON™, a polyurethane, a polyester elastomer such as that marketed by DuPont under the trademark Hytrel™, or a polyether amide such as that marketed by Elf Atochem S.A. under the trademark Pebax™, a blend of two or more non-ionomeric thermoplastic or thermosetting materials, or a blend of one or more ionomers and one or more non-ionomeric thermoplastic materials.

The outer layer is fairly thin (i.e. from about 0.010 to about 0.10 inches in thickness, more desirably 0.03 to 0.06 inches in thickness for a 1.680 inch ball and 0.03 to 0.06 inches in thickness for a 1.72 inch or more ball), but thick enough to achieve desired playability characteristics while minimizing expense. Thickness is defined as the average thickness of the non-dimpled areas of the outer cover layer. The outer cover layer, such as layer 16, has a Shore D hardness of at least 1 point softer than the inner cover or Shore D of 57 or less.

In one embodiment, the outer cover layer preferably is formed from an ionomer which constitutes at least 75 weight % of an acrylate ester-containing ionic copolymer or blend of acrylate ester-containing ionic copolymers. This type of outer cover layer in combination with the core and inner cover layer described above results in golf ball covers having a favorable combination of durability and spin rate. The one or more acrylate ester-containing ionic copolymers each contain an olefin, an acrylate ester, and an acid. In a blend of two or more acrylate ester-containing ionic copolymers, each copolymer may contain the same or a different olefin, acrylate ester and acid than are contained in the other copolymers. Preferably, the acrylate ester-containing ionic copolymer or copolymers are terpolymers, but additional monomers can be combined into the copolymers if the monomers do not substantially reduce the scuff resistance or other good playability properties of the cover.

For a given copolymer, the olefin is selected from the group consisting of olefins having 2 to 8 carbon atoms, including, as non-limiting examples, ethylene, propylene, butene-1, hexene-1 and the like. Preferably the olefin is ethylene.

The acrylate ester is an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, α-chloroacrylic, crotonic, maleic, fumaric, and itaconic acid, or the like, and half esters of maleic, fumaric and itaconic acid, or the like. The acid group of the copolymer is 10–100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50–100%.

The one or more acrylate ester-containing ionic copolymers each has an individual Shore D hardness of about 5–64. The overall Shore D hardness of the outer cover is 57 or less, and generally is 40–55. It is preferred that the overall Shore D hardness of the outer cover is in the range of 40–50 in order to impart particularly good playability characteristics to the ball.

The outer cover layer of the invention is formed over a core to result in a golf ball having a coefficient of restitution of at least 0.760, more preferably at least 0.770, and most preferably at least 0.780. The coefficient of restitution of the ball will depend upon the properties of both the core and the cover. The PGA compression of the golf ball is 100 or less, and preferably is 90 or less.

The acrylate ester-containing ionic copolymer or copolymers used in the outer cover layer can be obtained by neutralizing commercially available acrylate ester-containing acid copolymers such as polyethylene-methyl acrylate-acrylic acid terpolymers, including ESCOR™ ATX (Exxon Chemical Company) or poly (ethylene-butyl acrylate-methacrylic acid) terpolymers, including NUCREL™ (DuPont Chemical Company). Particularly preferred commercially available materials include ATX 320, ATX 325, ATX 310, ATX 350, and blends of these materials with NUCREL™ 010 and NUCREL™ 035. The acid groups of these materials and blends are neutralized with one or more of various cation salts including zinc, sodium, magnesium, lithium, potassium, calcium, manganese, nickel, etc. The degree of neutralization ranges from 10–100%. Generally, a higher degree of neutralization results in a harder and tougher cover material. The properties of non-limiting examples of commercially available un-neutralized acid terpolymers which can be used to form the golf ball outer cover layers of the invention are provided below in Table 7.

TABLE 7

Properties of Un-Neutralized Acid Terpolymers

| Trade Name | Melt Index dg/min ASTM D 1238 | Acid No. % KOH/g | Flex Modulus MPa (ASTM D790) | Hardness (Shore D) |
|---|---|---|---|---|
| ATX 310 | 6 | 45 | 80 | 44 |
| ATX 320 | 5 | 45 | 50 | 34 |
| ATX 325 | 20 | 45 | 9 | 30 |
| ATX 350 | 6 | 15 | 20 | 28 |
| Nucrel ™ 010 | 11 | 60 | 40 | 40 |
| Nucrel ™ 035 | 35 | 60 | 59 | 40 |

The ionomer resins used to form the outer cover layers can be produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the high acid copolymer. When two or more different copolymers are to be used, the copolymers can be blended before or after neutralization. Generally, it is preferable to blend the copolymers before they are neutralized to provide for optimal mixing.

The compatibility of the acrylate ester-containing copolymers with each other in a copolymer blend produces a golf ball outer cover layer having a surprisingly good scuff resistance for a given hardness of the outer cover layer. The golf ball according to the invention has a scuff resistance of no higher than 3.0. It is preferred that the golf ball has a scuff resistance of no higher than about 2.5 to ensure that the golf ball is scuff resistant when used in conjunction with a variety of types of clubs, including sharp-grooved irons, which are particularly inclined to result in scuffing of golf ball covers. The best results according to the invention are obtained when the outer cover layer has a scuff resistance of no more than about 2.0.

Additional materials may also be added to the inner and outer cover layer of the present invention as long as they do not substantially reduce the playability properties of the ball. Such materials include dyes (for example, Ultramarine Blue™ sold by Whitaker, Clark, and Daniels of South Plainsfield, N.J.) (see U.S. Pat. No. 4,679,795), pigments such as titanium dioxide, zinc oxide, barium sulfate and zinc sulfate; UV absorbers; optical brighteners such as Eastobrite™ OB-1 and Uvitex™ OB antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, etc., and reinforcing materials such as glass fibers and inorganic fillers, as long as the desired properties produced by the golf ball covers of the invention are not impaired.

The outer layer in another embodiment of the invention includes a blend of a soft (low acid) ionomer resin with a small amount of a hard (high acid) ionomer resin. A low modulus ionomer suitable for use in the outer layer blend has a flexural modulus measuring from about 1,000 to about 10,000 psi, with a hardness of about 20 to about 40 on the Shore D scale. A high modulus ionomer herein is one which measures from about 15,000 to about 70,000 psi as measured in accordance with ASTM method D-790. The hardness may be defined as at least 50 on the Shore D scale as measured in accordance with ASTM method D-2240, but on the ball and not on a plaque.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin having from about 2 to 8 carbon atoms, methacrylic acid, acrylic acid, or another, $\alpha$, $\beta$-unsaturated carboxylic acid, and an unsaturated monomer of the acrylate ester class having from 1 to 21 carbon atoms. The soft ionomer is preferably made from an acrylic acid base polymer is an unsaturated monomer of the acrylate ester class.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow, (which corresponds to improved, more efficient molding, i.e., fewer rejects) as well as significant cost savings versus the outer layer of multi-layer balls produced by other known hard-soft ionomer blends as a result of the lower overall raw materials cost and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 8

Physical Properties of Iotek 7520

| Property Value | ASTM Method | Units | Typical |
| --- | --- | --- | --- |
| Melt Index | D-1238 | g/10 min. | 2 |
| Density | D-1505 | kg/m³ | 0.962 |
| Cation | | Zinc | |
| Melting Point | D-3417 | ° C. | 66 |
| Crystallization Point | D-3417 | ° C. | 49 |
| Vicat Softening Point | D-1525 | ° C. | 42 |

TABLE 8-continued

Physical Properties of Iotek 7520

| Property Value | ASTM Method | Units | Typical |
| --- | --- | --- | --- |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | G % | 52 |
| De Mattia Flex Resistance | D-430 | Cycles | >5000 |

In addition, test data collected by the inventor indicates that Iotek 7520 resins have Shore D hardnesses of about 32 to 36 (per ASTM D-2240), melt flow indexes of 30.5 g/10 min (at 190° C. per ASTM D-1288), and a flexural modulus of about 2500–3500 psi (per ASTM D-790). Furthermore, testing by an independent testing laboratory by pyrolysis mass spectrometry indicates at Iotek 7520 resins are generally zinc salts of a terpolymer of ethylene, acrylic acid, and methyl acrylate.

Furthermore, the inventor has found that a newly developed grade of an acrylic acid based soft ionomer available from the Exxon Corporation under the designation Iotek 7510 is also effective when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn™ 8625 and Surlyn™ 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 in comparison of those of Iotek 7520 are set forth below:

TABLE 9

Physical Properties of Iotek 7510 in Comparison to Iotek 7520

| | IOTEK 7520 | IOTEK 7510 |
| --- | --- | --- |
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |

TABLE 9-continued

Physical Properties of Iotek 7510
in Comparison to Iotek 7520

|  | IOTEK 7520 | IOTEK 7510 |
|---|---|---|
| Elongation, % | 760 | 690 |
| Hardness, Shore D | 32 | 35 |

The hard ionomer resins utilized to produce the outer cover layer composition hard/soft blends include ionic copolymers which are the sodium, zinc, magnesium, lithium, etc. salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor™ and sold under the designation "Iotek" are somewhat similar to the hard ionomeric resins sold under the Surlyn™ trademark. However, since the "Iotek" ionomeric resins are sodium or zinc salts of poly(ethylene-acrylic acid) and the Surlyn™ resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn™ hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn™ 8940 and the hard zinc ionic copolymer sold under the trademark Surlyn™ 9910. Surlyn™ 8940 is a copolymer of ethylene with methacrylic acid and about 15 weight percent acid which is about 29 percent neutralized with sodium ions. This resin has an average melt flow index of about 2.8. Surlyn™ 9910 is a copolymer of ethylene and methacrylic acid with about 15 weight percent acid which is about 58 percent neutralized with zinc ions. The average melt flow index of Surlyn™ 9910 is about 0.7. The typical properties of Surlyn™ 9910 and 8940 are set forth below in Table 10:

TABLE 10

Typical Properties of Commercially Available Hard
Surlyn ™ Resins Suitable for Use in the Outer Layer Blends
of the Present Invention

|  | ASTM D | 8940 | 9910 | 8920 | 8528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m$_2$ (ft.-lbs./in$^2$) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present outer cover composition sold under the "Iotek" trade name by the Exxon Corporation include Iotek 8000, 8010, 8020, 8030, 7030, 7010, 7020, 1002, 1003, 959 and 960. The physical properties of Iotek 959 and 960 are shown above. The typical properties of the remainder of these and other Iotek hard ionomers suited for use in formulating the outer layer cover composition are set forth below in Table 11:

TABLE 11

Typical Properties of Iotek Ionomers

| Resin Properties | ASTM Method | Units | 4000 | 4010 | 8000 | 8020 | 8030 |
|---|---|---|---|---|---|---|---|
| Cation type |  |  | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | ° C. | 90 | 90 | 90 | 87.5 | 87.5 |

TABLE 11-continued

Typical Properties of Iotek Ionomers

| | | | | | | | |
|---|---|---|---|---|---|---|---|
| Crystallization Point | D-3417 | °C. | 62 | 64 | 56 | 53 | 55 |
| Vicat Softening Point | D-1525 | °C. | 62 | 63 | 61 | 64 | 67 |
| % Weight Acrylic Acid | | | 16 | | 15 | | |
| % of Acid Groups cation neutralized | | | 30 | | 40 | | |

| Plaque Properties | ASTM Method | Units | 4000 | 4010 | 8000 | 8020 | 8030 |
|---|---|---|---|---|---|---|---|
| (3 mm thick, compression molded) | | | | | | | |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |

| Film Properties (50 micron film 2.2:1 Blow-up ratio) | | | | 4000 | 4010 | 8000 | 8020 | 8030 |
|---|---|---|---|---|---|---|---|---|
| Tensile at Break | MD | D-882 | MPa | 41 | 39 | 42 | 52 | 47.4 |
|  | TD | D-882 | MPa | 37 | 38 | 38 | 38 | 40.5 |
| Yield point | MD | D-882 | MPa | 15 | 17 | 17 | 23 | 21.6 |
|  | TD | D-882 | MPa | 14 | 15 | 15 | 21 | 20.7 |
| Elongation at Break | MD | D-882 | % | 310 | 270 | 260 | 295 | 305 |
|  | TD | D-882 | % | 360 | 340 | 280 | 340 | 345 |
| 1% Secant modulus | MD | D-882 | MPa | 210 | 215 | 390 | 380 | 380 |
|  | TD | D-882 | MPa | 200 | 225 | 380 | 350 | 345 |
| Dart Drop Impact | | D-1709 | g/micron | 12.4 | 12.5 | 20.3 | | |

| Resin Properties | ASTM Method | Units | 7010 | 7020 | 7030 |
|---|---|---|---|---|---|
| Cation type | | | zinc | zinc | zinc |
| Melt Index | D-1238 | g/10 min. | 0.8 | 1.5 | 2.5 |
| Density | D-1505 | kg/m³ | 960 | 960 | 960 |
| Melting Point | D-3417 | NC | 90 | 90 | 90 |
| Crystallization Point | D-3417 | NC | — | — | — |
| Vicat Softening Point | D-1525 | NC | 60 | 63 | 62.5 |
| % Weight Acrylic Acid | | | — | — | — |
| % of Acid Groups Cation Neutralized | | | — | — | — |

| Plaque Properties | ASTM Method | Units | 7010 | 7020 | 7030 |
|---|---|---|---|---|---|
| (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

It has been determined that when hard/soft ionomer blends are used for the outer cover layer, good results are achieved when the relative combination is in a range of about 3–25 percent hard ionomer and about 75–97 percent soft ionomer.

Moreover, in alternative embodiments, the outer cover layer formulation may also comprise up to 100 wt % of a soft, low modulus non-ionomeric thermoplastic material including a polyester polyurethane such as B.F. Goodrich Company's Estane™ polyester polyurethane X-4517. The non-ionomeric thermoplastic material may be blended with a soft ionomer. For example, polyamides blend well with soft ionomer. According to B.F. Goodrich, Estane™ X-4517 has the following properties:

Properties of Estane™ X-4517

| | |
|---|---|
| Tensile | 1430 |
| 100% | 815 |
| 200% | 1024 |
| 300% | 1193 |

| -continued | |
|---|---|
| Elongation | 641 |
| Youngs Modulus | 1826 |
| Hardness A/D | 88/39 |
| Bayshore Rebound | 59 |
| Solubility in Water | Insoluble |
| Melt processing temperature | >350NF (>177NC) |
| Specific Gravity (H$_2$O = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced travel distance characteristic produced by the high acid ionomer resin composition. These include, but are not limited to, thermoplastic polyurethanes such as Texin™, thermoplastic polyurethanes from Mobay Chemical Co. and the Pellethane™ thermoplastic polyurethanes from Dow Chemical Co.; non-ionomeric thermoset polyurethanes including but not limited to those disclosed in U.S. Pat. No. 5,334,673; cross-linked metallocene catalyzed polyolefins; ionomer/rubber blends such as those in Applicants' U.S. Pat. Nos. 4,986,545; 5,098,105 and 5,187,013; and, Hytrel™ polyester elastomers from DuPont and Pebax™ polyetheramides from Elf Atochem S.A.

B. Single Layer Covers

The cores of the present invention can also be covered by a single cover layer. Preferably, the single layer covers are comprised of the outer layer cover materials discussed above. Additionally, the single layer covers can also comprise the inner cover materials referenced above.

Method of Making Golf Ball

In preparing golf balls in accordance with the present invention, a cover layer is molded (by injection molding or by compression molding) about a core (a dual core).

The dual cores of the present invention are preferably formed by the compression molding techniques set forth above. However, it is fully contemplated that liquid injection molding or transfer molding techniques could also be utilized.

A relatively hard inner cover layer is then molded about the resulting dual core component. The diameter of the inner cover is about 1.570 inches. A comparatively softer outer cover layer is then molded about the inner cover layer. The outer cover diameter is about 1.680 inches. Details of molding the inner and outer covers are set forth herein. Alternatively, a single soft cover can be molded around the dual core.

Generally, the inner cover layer which is molded over the dual core component, is about 0.01 inches to about 0.10 inches in thickness, preferably about 0.03–0.07 inches thick. The inner ball which includes the core and inner cover layer preferably has a diameter in the range of 1.25 to 1.60 inches. The outer cover layer is about 0.01 inches to about 0.10 inches in thickness. Together, the dual core, the inner cover layer and the outer cover layer combine to form a ball having a diameter of 1.680 inches or more, the minimum diameter permitted by the rules of the United States Golf Association and weighing no more than 1.62 ounces.

Most preferably, the resulting golf balls in accordance with the present invention have the following dimensions:

| Size Specifications: | | Range | Preferred |
|---|---|---|---|
| Inner Core | Max. | 0.830" | 0.344" |
| | Min. | 0.200" | 0.340" |
| Outer Core | Max. | 1.60" | 1.595" |
| | Min. | 1.25" | 1.47" |
| Cover Thickness | Max. | 0.215" | 0.065" |
| | Min. | 0.040" | 0.040" |

In a particularly preferred embodiment of the invention, the golf ball has a dimple pattern which provides coverage of 60%–70% or more. The golf ball typically is coated with a durable, abrasion-resistant, relatively non-yellowing finish coat.

The various cover composition layers of the present invention may be produced according to conventional melt blending procedures. Generally, the copolymer resins are blended in a Banbury™ type mixer, two-roll mill, or extruder prior to neutralization. After blending, neutralization then occurs in the melt or molten states in the Banbury™ mixer. Mixing problems are minimal because preferably more than 75 wt %, and more preferably at least 80 wt % of the ionic copolymers in the mixture contain acrylate esters and, in this respect, most of the polymer chains in the mixture are similar to each other. The blended composition is then formed into slabs, pellets, etc., and maintained in such a state until molding is desired.

Alternatively, a simple dry blend of the pelletized or granulated resins which have previously been neutralized to a desired extent and colored masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer. In one embodiment of the invention, a masterbatch of non-acrylate ester-containing ionomer with pigments and other additives incorporated therein is mixed with the acrylate ester-containing copolymers in a ratio of about 1–7 weight % masterbatch and 93–99 weight % acrylate ester-containing copolymer. However, a masterbatch is generally not used commercially to form the inner cover or mantle layer due to cost concerns.

The golf balls of the present invention can also be produced by molding processes which include but are not limited to those which are currently well known in the golf ball art. For example, the golf balls can be produced by injection molding or compression molding the novel cover compositions around a solid molded core to produce an inner ball which typically has a diameter of about 1.25 to 1.60 inches. The core, preferably of a dual core configuration, may be formed as previously described. The outer layer is subsequently molded over the inner layer to produce a golf ball having a diameter of preferably about 1.680 inches or more.

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° to about 100° F. Subsequently, the outer cover layer is molded around the core and the inner layer by similar compression or injection molding techniques to form a dimpled golf ball of a diameter of 1.680 inches or more.

After formation of the balls, the balls are optionally subjected to gamma radiation. This has been found to crosslink the cover to improve scuff and cut resistance. Furthermore, the gamma radiation has also been found to increase the crosslink density of the core and results in a harder and higher compression core and ball. And so, the Shore C hardness of the core typically increases after gamma treatment.

After molding and/or radiation treatment, the golf balls produced may undergo various further processing steps such as buffing, painting and marking as disclosed in U.S. Pat. No. 4,911,451.

The resulting golf ball produced from the hard inner layer and the relatively softer, low flexural modulus outer layer provide for an improved multi-layer golf ball having a unique dual core configuration which provides for desirable coefficient of restitution and durability properties while at the same time offering the feel and spin characteristics associated with soft balata and balata-like covers of the prior art.

Golf balls according to the invention preferably have a PGA compression of 10–120. In a particularly preferred form of the invention, the golf balls have a PGA compression of about 40–100. It has been found that excellent results are obtained when the PGA compression of the golf balls is 60–100. The coefficient of restitution of the golf balls of the invention is in the range of 0.770 or greater. Preferably, the C.O.R. of the golf balls is in the range of 0.770–0.830 and most preferably 0.790–0.830.

As mentioned above, resiliency and compression are amongst the principal properties involved in a golf ball's performance. In the past, PGA compression related to a scale of 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression in determined by an apparatus fashioned in the form of a small press with an upper and lower anvil. The upper anvil is at rest against a die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J., now manufactured by OK Automation of Sinking Spring, Pa. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicants also utilize a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a load designed to emulate the force applied by the Atti or PGA compression tester. Using such a device, a Riehle compression of 61 corresponds to a deflection under load of 0.061 inches.

Additionally, an approximate relationship between Riehle compression and PGA compression exists for balls of the same size. It has been determined by Applicants that Riehle compression corresponds to PGA compression by the general formula PGA compression=160–Riehle compression. Consequently, 80 Riehle compression corresponds to 80 PGA compression, 70 Riehle corresponds to 90 PGA compression, and 60 PGA compression corresponds to 100 PGA compression. For reporting purposes, Applicants' compression values are usually measured as Riehle compression and converted to PGA compression.

Furthermore, additional compression devices may also be utilized to monitor golf ball compression so long as the correlation to PGA compression is known. These devices have been designed, such as a Whitney Tester, to correlate or correspond to PGA compression through a set relationship or formula.

As used herein, "Shore D hardness" or "Shore C hardness" of a core or cover component is measured generally in accordance with ASTM D-2240, except the measurements are made on the curved surface of the molded component, rather than on a plaque. Furthermore, the Shore C-D hardness of the cover is measured while the cover remains over the core. When a hardness measurement is made on a dimpled cover, Shore C-D hardness is measured at a land area of the dimpled cover.

Golf balls according to the invention have a cut resistance in the range of 1–3 on a scale of 1–5. It is preferred that the golf balls of the invention have a cut resistance of 1–2.5 and most preferably 1–2.

The scuff resistance test was conducted in the following manner: a Top-Flite™ Tour pitching wedge (1994) with box grooves was obtained and was mounted in a Miyamae™ driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a clubhead speed of 125 feet per second. Three samples of each ball were tested. Each ball was hit three times. After testing, the balls were rated according to the following table:

| Rating | Type of damage |
| --- | --- |
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

Cut resistance was measured in accordance with the following procedure: A golf ball was fired at 135 feet per second against the leading edge of a 1994 Top-Flite™ Tour pitching wedge, wherein the leading edge radius is 1/32 inch, the loft angle is 51 degrees, the sole radius is 2.5 inches, and the bounce angle is 7 degrees. The cut resistance of the balls tested herein was evaluated on a scale of 1–5. A 5 represents a cut that extends completely through the cover to the Core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

The spin rate of the ball of the invention may be tested in the manner described in Example 2 below.

Having generally described the invention, the following examples are included for purposes of illustration so that the invention may be more readily understood and are in no way intended to limit the scope of the invention unless otherwise specifically indicated.

EXAMPLES

Example 1

Dual Core Golf Ball with Heavy Elastomeric Nucleus Comprising a Tungsten Powder/Polybutadiene Rubber Core, 11/32" Diameter 1A. A Dual Core and a Dual Cover Golf Ball A heavy spherical center core layer containing powdered tungsten metal in a polybutadiene matrix and having a diameter of 0.344 inches (8.74 mm) was formed with the following composition:

| Components | phr |
| --- | --- |
| Neo Cis 40 Butadiene Rubber | 100.0 |
| Kuliter™ Tungsten Powder (5 microns) | 1248.5 |
| Iron Powder | 100.0 |
| Zinc Oxide | 5.0 |
| Varox™ 231XL Peroxide Initiator | 3.0 |
| Zinc Diacrylate | 0.0 |
| TOTAL | 1456.5 |

The spherical center core layer comprising the above composition exhibited a specific gravity of 7.65, a weight of 2.7 grams, and a Shore C hardness of 80 (preferred range is 50–95).

The iron powder of the above composition was optional and was added to the composition in order to attract the formed center to a magnet. Such attraction allows for automated assembly of the 0.344 inch spherical center to the uncured preformed half shells in golf ball production.

As mentioned above, zinc diacrylate (ZDA) is not included in the composition of the center core layer of the present invention. Zinc diacrylate is normally added to core compositions in golf ball production in order to increase hardness.

An outer core layer was disposed about the spherical center core layer presented above. The outer core layer had the following composition:

| Components | phr |
| --- | --- |
| BCP-820 | 40 |
| Neo Cis 40 | 30 |
| Neo Cis 60 | 30 |
| Zinc Oxide | 13.7 |
| Zinc Stearate | 16 |
| Zinc Diacrylate | 21.3 |
| Trigonox 42-40 Peroxide | 1.25 |
| Total | 152.25 |

The molded dual core comprising a spherical center and outer core layer with the above compositions exhibited the following properties:

| Molded Dual Core Properties | |
| --- | --- |
| Size (inches) | 1.478 |
| | (37.5 mm) |
| Weight (grams) | 32.83 |
| Riehle Compression | 140 |
| | (.140 inches of deformation) |
| C.O.R. | 0.768 |
| Specific Gravity | 1.10 |

A centerless ground dual core comprising a spherical center and outer core layer with the above compositions exhibited the following properties:

| Centerless Ground Dual Core Properties | |
| --- | --- |
| Size (inches) | 1.469 |
| | (37.3 mm) |

-continued

| Centerless Ground Dual Core Properties | |
|---|---|
| Weight (grams) | 32.24 |
| Riehle Compression | 137 |
| | (.137 inches) |
| C.O.R. | 0.774 |
| Specific Gravity | 1.18 |

In forming a multi-layered golf ball comprising the dual core having a spherical center core layer and an outer core layer with the above compositions, the following inner cover layer, i.e., mantle layer, composition was used:

| Inner Cover (Mantle) Layer Composition | |
|---|---|
| Components | phr |
| Iotek 1002 | 50 |
| Iotek 1003 | 50 |
| Total | 100 |

Upon the formation of the inner cover layer on the dual core to form an intermediate ball, the combination of an inner cover layer and dual core exhibited the following properties:

| Combination of Inner Cover Layer and Dual Core Properties | |
|---|---|
| Size (inches) | 1.570 |
| Weight (grams) | 38.3 |
| Riehle Compression | 113 |
| | (.113 inches) |
| C.O.R. | 0.803 |
| Shore D | 68–72 |
| Specific Gravity | 1.15 |

An outer cover layer was disposed about the inner cover layer having the following formulation:

| Outer Cover Layer Composition | |
|---|---|
| Components | Parts by Weight |
| Iotek 7510 | 41 |
| Iotek 7520 | 49.5 |
| White M.B.[1] (Master Batch) | 9.5 |

[1]White M.B. comprises the following composition:
100 pts. Surlyn AD8549
31.3 pts. Unitane 0–110
0.60 pts. Ultra Marine Blue
0.34 pts. Eastobrite OB-1
0.05 pts. Santonox R The molded balls may optionally be subjected to gamma radiation treatment at about 40 kilograys to crosslink the cover to improve scuff and cut resistance. The gamma radiation also increases the crosslink density of the core and results in a harder core and ball compression. Below is a comparison of properties exhibited by a golf ball prior to gamma radiation and properties exhibited by a golf ball subjected to gamma radiation:

| Dual Core, Multi-Layered, Golf Ball Properties | | | | |
|---|---|---|---|---|
| Golf Ball | Size (inches) | Weight (grams) | Riehle Compression | C.O.R. |
| Molded Ball Before Gamma Radiation | 1.685 | 45.2 | 104 (.104 inches) | 0.789 |
| Molded Ball After Gamma Radiation | 1.683 | 45.2 | 87 (.087 inches) | 0.805 |
| Finished Golf Ball | 1.684 | 45.3 | 87 (.087 inches) | 0.805 |

1B. A Dual Core and Single Layer Golf Ball

A spherical center core layer having a diameter of 0.344 inches was formed with the following composition:

| Components | phr |
|---|---|
| Neo Cis 40 Butadiene Rubber | 100.0 |
| Kulite Tungsten Powder (5 microns) | 1248.5 |
| Iron Powder | 100.0 |
| Zinc Oxide | 5.0 |
| Varox 231XL Peroxide | 3.0 |
| Zinc Diacrylate | 0.0 |
| TOTAL | 1456.5 |

The spherical center comprising the above composition exhibited a specific gravity of 7.65, a weight of 2.7 grams, and a Shore C hardness of 80.

Again, the iron powder of the above composition was again optional and was added to the composition in order to attract the composition to a magnet. As mentioned above, such attraction allows for automated assembly of the 0.344 inch spherical center to the uncured preformed half shells in golf ball production.

An outer core layer was disposed about the spherical center having the following composition:

| Components | phr |
|---|---|
| BCP-820 | 40 |
| Neo Cis 40 | 30 |
| Neo Cis 60 | 30 |
| Zinc Oxide | 9.5 |
| Zinc Stearate | 16 |
| Zinc Diacrylate | 29 |
| Trignonox 42-40 Peroxide | 1.25 |
| Total | 155.75 |

The molded dual core comprising a spherical center core layer and an outer core layer with the above compositions exhibited the following properties:

| Molded Dual Core Properties (with 11/32" Heavy Weight Spherical Center) | |
|---|---|
| Size (inches) | 1.559 |
| Weight (grams) | 38.1 |
| Riehle Compression | 94 (0.094") |
| C.O.R. | 0.799 |
| Specific Gravity | 1.11 |

A single layer cover was disposed about the dual core having the following composition:

Cover Layer Composition

| Components | Parts by Weight |
|---|---|
| Iotek 7510 | 41 |
| Iotek 7520 | 49.5 |
| White M.B.[1] | 9.5 |
| Total | 100 |

[1] White M.B. comprises the following composition:
100 pts. Surlyn AD8549
31.3 pts. Unitane 0–110
0.60 pts. Ultra Marine Blue
0.34 pts. Eastobrite OB-1
0.05 pts. Santonox R Once again, the molded balls may optionally be subjected to gamma radiation treatment at about 40 kilograys to crosslink the cover to improve scuff and cut resistance. The gamma radiation also increases the crosslink density of the core and results in a harder core and ball compression. Below is a comparison of properties exhibited by a golf ball prior to gamma radiation and properties exhibited by a golf ball subjected to gamma radiation:

Dual Core, Single-Layered Golf Ball Properties

| Golf Ball | Size (inches) | Weight (grams) | Riehle Compression | C.O.R. |
|---|---|---|---|---|
| Molded Ball Before Gamma Radiation | 1.684 | 45.8 | 96 (.096 inches) | 0.792 |
| Molded Ball After Gamma Radiation | 1.681 | 45.8 | 77 (.077 inches) | 0.814 |
| Finished Golf Ball | 1.682 | 45.9 | 76 (.076 inches) | 0.816 |

Example 2

Spin rate testing was conducted with the finished multi-layered covered, dual core golf balls (Example 1A) and single-layered cover, dual core golf balls (Example 1B) of above Example using a driver, a 5 iron, a 9 iron, and a pitching wedge. The golf ball testing machine was set up to emulate the launch conditions of an average Touring Professional Golfer for each particular club. For comparative purposes, commercial golf balls were also tested for spin rate using the same clubs.

Below are the results of the spin rate testing:

Spin Rate Data for Examples 1A (Dual Core, Dual Cover) and 1B (Dual Core, Single Cover)

| Club | Ball Type | Launch Angle | Spin Rate (rpm) | Ball Velocity (ft./sec.) |
|---|---|---|---|---|
| 10.5 Intimidator ™ | Example 1A | 10.9 | 3806 | 229.5 |
| | Example 1B | 10.3 | 3072 | 231.1 |
| Driver | Strata ™ Professional 90 | 10.7 | 2896 | 227.4 |
| | Precept ™ MC Spin | 11.1 | 2888 | 226.5 |
| | Titleist ™ Prestige 90 | 11.0 | 3074 | 227.7 |
| 5 Iron Apex Plus ™ | Example 1A | 15.7 | 5798 | 184.5 |
| | Example 1B | 15.0 | 7347 | 182.2 |
| | Strata ™ Professional 90 | 15.8 | 5713 | 182.5 |
| | Precept ™ MC Spin | 15.8 | 5445 | 183.1 |
| | Titleist ™ Prestige 90 | 15.2 | 5840 | 181.3 |
| 9 Iron Apex Plus ™ | Example 1A | 24.0 | 8668 | 145.2 |
| | Example 1B | 21.9 | 10607 | 143.3 |
| | Strata ™ Professional 90 | 24.1 | 8713 | 145.4 |
| | Precept ™ MC Spin | 23.9 | 8579 | 144.7 |
| | Titleist ™ Prestige 90 | 24.1 | 8395 | 143.7 |
| Pitching Wedge Apex Plus ™ | Example 1A | 29.0 | 10571 | 132.9 |
| | Example 1B | 27.0 | 12654 | 133.5 |
| | Strata ™ Professional 90 | 27.6 | 10467 | 133.6 |
| | Precept ™ MC Spin | 28.2 | 10656 | 132.5 |
| | Titleist ™ Prestige 90 | 29.2 | 10105 | 130.0 |

The above results indicate that the solid, non-wound golf balls having a heavy elastomeric center exhibit enhanced overall high spin properties.

Example 3

One half of the polybutadiene rubber utilized in the inner core of Examples 1–2 was deleted and substituted with polyisoprene. Specifically, 50 phr of Natsyn 2000 was substituted for Neo-Cis 40 according to the following formula:

| MATERIAL | ACTUAL PHR | Sp. Gr. |
|---|---|---|
| Enichem Neo Cis 40 | 50.00 | 0.910 |
| Goodyear Natsyn 2200 | 50.00 | 0.910 |
| Kulite Tungsten Powder (5 microns) | 1386.40 | 19.350 |
| Aldrich Iron Oxide, $Fe_3O_4$ (less than 5 microns) | 64.90 | 5.100 |
| Zinc Oxide | 5.00 | 5.570 |
| Varox 231 XL Peroxide | 7.50 | 1.410 |
| TOTALS | 1563.80 | 7.800 |

Inner cores having the following properties were produced:

Specifications:

size: 0.340 inches, 0.006 inches weight: 2.77 grams, 0.1 grams hardness: 62 Shore C peak 5 points The inner cores, when enclosed with the above outer core and cover formulations, produced golf balls exhibiting the enhanced characteristics of the balls of Example 1.

Example 4

The inner cores produced in Example 3 above, were further encapsulated by several different types of outer core, inner cover (mantle) and outer cover materials at different sizes and thicknesses in order to produce several types of alternative 2×2 constructions. In this regard, the following finished or molded dual cores (inner core layer encompassed by the outer core layer) were produced:

A) "A" Cores 1.500" 2×2 Core with a Riehle Compression of 120–125

| Outer Core Layer Material | ACTUAL PHR | Sp.Gr. |
|---|---|---|
| BCP-820 | 40.00 | 0.910 |
| Neo-Cis 60 | 30.00 | 0.910 |
| Neo-Cis 40 | 30.00 | 0.910 |
| Zinc Oxide | 13.10 | 5.570 |
| Zn Stearate | 16.00 | 1.090 |
| ZDA | 21.75 | 2.100 |
| Red MB | 0.10 | 1.500 |
| Trigonox 42-40b Peroxide | 1.25 | 1.400 |
| TOTALS | 152.20 | 1.101 |

Molded Dual Core Properties

Target Compression = 120–125  Chilled Compression = 125–130
Compound S.G. = 1.1010  Molded Core Size (in) = 1.545
Target S.G. = 1.1010  Molded Volume (cc) = 31.644
Batch Factor = 29.000  Molded Core Wt. (g) = 34.84
Vol. Occupied = 4008.9  Final Target Size (in) = 1.500
Polymer Volume = 79.49%  Core Volume (cc) = 28.958
Slug Weight (.5 grams) = .18  Final Core Weight (g) = 34.265
Center Weight = 2.7729  Outer Core Vol. (cc) = 28.603
Center Size = 0.3460  Outer Core Wt. (g) = 31.492
Center Specific Gravity = 7.802
Center Volume = 0.36

B) "B" Cores 1.510" 2×2 Core with a Riehle Compression of 115–120

| Material | ACTUAL PHR | Sp.Gr. |
|---|---|---|
| BCP-820 | 40.00 | 0.910 |
| Neo-Cis 60 | 30.00 | 0.910 |
| Neo-Cis 40 | 30.00 | 0.910 |
| Zinc Oxide | 11.58 | 5.570 |
| Zn Stearate | 16.00 | 1.090 |
| ZDA | 23.50 | 2.100 |
| Orange MB | 0.10 | 1.500 |
| Trigonox 42-40b Peroxide | 1.25 | 1.400 |
| TOTALS | 152.43 | 1.098 |

Molded Dual Core Properties

Target Compression = 115–120  Chilled Compression = 120–125
Compound S.G. = 1.0982  Molded Core Size (in) = 1.545
Target S.G. = 1.0980  Molded Volume (cc) = 31.644
Batch Factor = 29.000  Molded Core Wt. (g) = 34.75
Vol. Occupied = 4025.1  Final Target Size (in) = 1.510
Polymer Volume = 79.17%  Core Volume (cc) = 29.541
Slug Weight.(.5 grams) = .18  Final Core Weight (g) = 34.825
Center Weight = 2.7729  Outer Core Vol. (cc) = 29.186
Center Size = 0.3460  Outer Core Wt. (g) = 32.052
Center Specific Gravity = 7.802  C.O.R = .7812
Center Volume = 0.36

C) "C" Cores 1.540" 2×2 Core with a Riehle Compression of 120–125

| Material | ACTUAL PHR | Sp.Gr. |
|---|---|---|
| BCP-820 | 40.00 | 0.910 |
| Neo-Cis 60 | 30.00 | 0.910 |
| Neo-Cis 40 | 30.00 | 0.910 |
| Zinc Oxide | 10.80 | 5.570 |
| Zn Stearate | 16.00 | 1.090 |
| ZDA | 22.50 | 2.100 |
| Green MB | 0.10 | 1.500 |
| Trigonox 42-406 Peroxide | 1.25 | 1.400 |
| TOTALS | 150.65 | 1.090 |

Molded Dual Core Properties

Target Compression = 120–125  Chilled Compression = 125–130
Compound S.G. = 1.0902  Molded Core Size (in) = 1.584
Target S.G. = 1.0900  Molded Volume (cc) = 34.101
Batch Factor = 29.000  Molded Core Wt. (g) = 37.18
Vol. Occupied = 4007.3  Final Target Size (in) = 1.540
Polymer Volume = 79.53%  Core Volume (cc) = 31.338
Slug Weight.(.5 grams) = 19  Final Core Weight (g) = 36.550
Center Weight = 2.7729  Outer Core Vol. (cc) = 30.982
Center Size = 0.3460  Outer Core Wt. (g) = 33.777
Center Specific Gravity = 7.802
Center Volume = 0.36

D) "D" Cores—1.470"–1.480" 2×2 Core

| Material | ACTUAL PHR | Sp.Gr. |
|---|---|---|
| BCP-820 | 40.00 | 0.910 |
| Neo-Cis 60 | 30.00 | 0.910 |
| Neo-Cis 40 | 30.00 | 0.910 |
| Zinc Oxide | 15.60 | 5.570 |
| Zn Stearate | 16.00 | 1.090 |
| ZDA | 20.75 | 2.100 |
| Color MB | 0.10 | 1.500 |
| Trigonox 42-40b Peroxide | 1.25 | 1.400 |
| TOTALS | 153.70 | 1.112 |

Molded Dual Core Properties

Target Compression = 137 (.137 inches)  Target S.G. = 1.1120
Compound S.G. = 1.1121  Polymer Volume = 79.51%
Batch Factor = 29.000  Target Size = 1.48 inches
Vol. Occupied = 4007.3  Core Volume (cc) = 27.815

The above dual cores were molded with inner cover (mantle) and outer cover materials of various thicknesses to produce the following alternative embodiments of the invention.

| Core Type | Mantle (Inner Cover) | Outer Cover | Dot Code | Size | Weight | Riehle (inches) | C.O.R. | NesFactor[4] | High Speed Rank | M.O.I. |
|---|---|---|---|---|---|---|---|---|---|---|
| Sample 1 (1.500") | 8140/9150 @ 50:50 (.035") | STP[1] (.055") | 1 Black | 1.684 | 45.56 | .082 | 0.804 | .886 | Less Comparable | 0.42347 |
| Sample 2 (1.510") | 8140/9150/6120 @ 50:25:25 (.040") | STP (.045") | 1 Red | 1.685 | 45.56 | .077 | 0.809 | .886 | Comparable | 0.42293 |
| Sample 3 (1.540") | 8140/9150 @ 50:50 (.035") | STP (.035") | 1 Orange | 1.692 | 46.24 | .081 | 0.8124 | .893 | Comparable | 0.43844 |
| Sample 4 (1.470") | 1002/1003 @ 50:50 (050") | STP (.055") | 1 Yellow | 1.684 | 45.55 | .083 | 0.7978 | .881 | Comparable | 0.41993 |
| Sample 5 (1.470") | 1002/1003 @ (.050") | (50/50)7520/ 6320 w/HCMB | 1 Blue | 1.685 | 45.50 | .083 | 0.798 | .881 | Best | 0.41979 |
| Sample 6 (1.480") | 8140/9150 @ 50/50 (.045") | (50/50)7520/ 6320 w/HCMB | 2 Orange | 1.684 | 45.55 | .084 | 0.7971 | .881 | Comparable | 0.42058 |
| Sample 7 Strata Tour Pro[2] | Production | Production | STP Stamp | N/A | N/A | .080 | N/A | N/A | N/A | 0.43770 |

| Dot Code | Description | Driver Spin | 5 Iron Spin | 9 Iron Spin | Chip Shot Spin | Diver Dist | 5 I. Carry Dist. | 9 Iron Dist. | Cut Rank | Scuff Rank |
|---|---|---|---|---|---|---|---|---|---|---|
| 1 Black | 8140/9150 @ 50:50 (.035") | 3277 | 6688 | 9682 | 4230 | 260.4 | 172.4 | N/A | Comparable | Comparable |
| 1 Red | 8140/9150/6120 @ 50:25:25 (.040") | Not Tested | Not Tested | Not Tested | 4221 | 263.5 | 171.4 | N/A | Comparable | Comparable |
| 1 Orange | 8140/9150 @ 50:50 (.035") | 2979 | 6184 | 9267 | 4129 | 262.5 | 175.5 | N/A | Comparable | Comparable |
| 1 Yellow | 1002/1003 @ 50:50 (.050") | 3121 | 6257 | 9456 | 4228 | 262.2 | 172 | N/A | Comparable | Comparable |
| 1 Blue | 1002/1003 @ (.050") | 3023 | 6116 | 9224 | 4132 | 261.4 | 174.2 | N/A | Slightly Better | Comparable |
| 2 Orange | 8140/9150 @ 50:50 (.045") | 2981 | 6134 | 9341 | 4057 | 261.5 | 172.3 | N/A | Slightly Better | Comparable |
| Strata Tour Pro Production[2] | Production | 2879 | 5945 | 8956 | 4074 | 263.2 | 172.1 | N/A | Comparable | Comparable |
| Titleist Pro V1[3] | N/A | Not Tested | Not Tested | Not Tested | 3990 | 263.3 | 172.1 | N/A | Comparable | Comparable |

[1]ASTP@ cover is the same outer cover material set forth in Example 1.
[2]Strata Tour Pro is Applicant = s commercially available Strata ™ Tour Professional ball which is a single core, dual cover golf ball having high spin characteristics.
[3]Titleist Pro V1 ball is a single core, dual cover (polyurethane outer cover) ball produced by Acushnet Company having high spin characteristics.
[4]Nes Factor is the sum of Riehle compression (in inches) and C.O.R.

The above results indicate that golf balls having thinner inner (mantle) and outer cover layers and larger cores exhibited optimal spin and distance characteristics. See for example, Samples 2 and 3.

Example 5

The centers or inner cores produced in Example 3 where encapsulated by an outer core layer material substantially similar in composition to that of the "C" cores of Example 4 to produce 1.510 inch dual cores. These dual cores were then covered by a thin inner cover layer of 0.0425 inches in thickness and a thin outer cover layer of the same thickness to produce a 1.68 inch golf ball. The composition of the various layers and their respective properties are set forth below.

A) Center or Inner Core

| Material | S.G. | Parts | Volume | 100% |
|---|---|---|---|---|
| Neo Cis 40 | 1 | 50.00 | 54.95 | 3.20 |
| Natsyn 2200 | 1 | 50.00 | 54.95 | 3.20 |
| Tungsten Powder | 19 | 1386.40 | 71.65 | 88.66 |
| Black Iron Oxide | 5 | 64.90 | 12.73 | 4.15 |
| Zinc Oxide | 6 | 5.00 | 0.90 | 0.32 |
| Varox 231 XL or Trig 29/40B Peroxide | 1 | 7.50 | 5.36 | 0.48 |
| TOTALS | 7.799 | 1563.80 | 200.52 | 100 |

| Batch Factor = 0.03 | Banbury volume = 3 |
|---|---|
| Target Hardness 5 = 62 | Molded Core Size = 0.343 inches |
| Target COR = N.A. | Core Volume = 0.35 cc |
| Calc. Slab Weight = 1690.0 grams | Target Core Weight = 2.70 grams |
| Target Slab Weight = 10 grams | Unicore Molds = N.A. |

B) Outer Core Layer

| Material | S.G. | Parts | Volume | 100% |
|---|---|---|---|---|
| Cariflex BPC-820 | 0.91 | 40.00 | 43.96 | 26.31 |
| Neo Cis 60 | 0.91 | 30.00 | 32.97 | 19.73 |
| Neo Cis 40 | 0.91 | 30.00 | 32.97 | 19.73 |
| Zinc Oxide | 5.57 | 12.25 | 2.20 | 8.06 |
| Zinc Stearate | 1.09 | 16.00 | 14.68 | 10.52 |
| ZDA | 2.1 | 22.25 | 10.60 | 14.63 |
| Orange MB | 1.5 | 0.30 | 0.20 | 0.20 |
| Trig 42-40B Peroxide | 1.4 | 1.25 | 0.89 | 0.82 |
| TOTALS | 1.098 | 152.05 | 138.46 | 100 |

| Batch Factor = 3.37 | Banbury volume = 450 |
|---|---|
| Target Compression = 122 | Molded Core Size = 1.525 inches |
| Target COR = 0.775 | Core Volume = 31.68 cc |
| Calc. Slug Weight = 16.0 grams | Target Core Weight = 34.79 grams |
| Target Slug Weight = 17.5 grams | Unicore Molds = .29 |
| 2 slugs per core | |

C) Inner Cover Layers—High Flow Ionomers

| Materials | Weight (Pounds) | Accumulative Weight Tare Scale to 0 LBS. | Weight % |
|---|---|---|---|
| Surlyn 6120 | 45.0 | 45.0 | 25.0 |
| Surlyn 8140 | 90.0 | 135.0 | 50.0 |
| Surlyn 9150 | 45.0 | 180.0 | 25.0 |

D) Outer Cover Layers

| Materials | Weight (Pounds) | Accumulative Weight | Weight % |
|---|---|---|---|
| White M.B. | 17.1 | 17.1 | 9.5 |
| Iotek 7510 | 73.8 | 164.7 | 41.0 |
| Iotek 7520 | 89.1 | 180.0 | 49.5 |

The materials and components produced a regulation size golf ball with a large core and thin cover layers having the following characteristics:

| Center or Inner Core Layer | Formula | "A" Above |
|---|---|---|
| | Size In. | 0.340 |
| | Wgt. Grams | 2.77 |
| | Shore C | 62 |
| Outer Core Layer | Formula | "B" Above |
| | Size In. | 1.51 |
| | Wgt. Grams | 34.8 |
| | Comp. Riehle | 0.122 inches |
| | C.O.R. | 0.775 |
| Inner Cover Layer | Cover Formula | "C" Above |
| | Size In. | 1.59 |
| | Wgt. Grams | 39.4 |
| | Comp. Riehle | 0.102 inches |
| | C.O.R. | 0.800 |
| | Mantle Thickness (In.) | 0.0425–0.043 |
| Outer Cover Layer (Pre-Gamma Treatment) | Cover Formula | "D" Above |
| | Size In. | 1.684 |
| | Wgt. Grams | 45.3 |
| | Comp. Riehle | 0.100 inches |
| | C.O.R. | 0.792 |
| | Cover Thickness (In.) | 0.0425 |
| Finished Ball (Post-Gamma Treatment) | Size In. | 1.682 |
| | Wgt. Grams | 45.4 |
| | Comp. Riehle | 0.080 inches |
| | C.O.R. | 0.805 |
| | Cover Thickness (In.) | 0.0425 |

Example 6

An additional relative thin covered embodiment of the present invention was produced using the same center and outer cover materials set forth in Example 5. However, in this embodiment, slightly altered outer core layer and inner cover layer materials were utilized. Moreover, the size and the thicknesses of the components differed somewhat. The materials and properties of the different layers in this relatively thin covered embodiment of the inventions are set forth below.

A) Center or Inner Core

| Outer Core Layer Material | ACTUAL PHR | Sp.Gr. |
|---|---|---|
| BCP-820 | 40.00 | 0.910 |
| Neo-Cis 60 | 30.00 | 0.910 |
| Neo-Cis 40 | 30.00 | 0.910 |
| Zinc Oxide | 13.10 | 5.570 |
| Zn Stearate | 16.00 | 1.090 |
| ZDA | 21.75 | 2.100 |
| Red M.B. | 0.10 | 1.500 |
| Trigonox 42-40b Peroxide | 1.25 | 1.400 |
| TOTALS | 152.20 | 1.101 |

Molded Dual Core Properties

| Target Compression = 137 | Target S.G. = 1.1120 |
|---|---|
| Compound S.G. = 1.1121 | Polymer Volume = 79.51% |
| Batch Factor = 29.000 | Target Size = 1.48 |
| Vol. Occupied = 4007.3 | Core Volume (cc) = 27.815 |

B) Outer Core Layer

| Outer Core Layer Material | ACTUAL PHR | Sp.Gr. | Vol. | Vol. % |
|---|---|---|---|---|
| BCP-820 | 40.00 | 0.910 | 43.956 | 31.85 |
| Neo-Cis 60 | 30.00 | 0.910 | 32.967 | 23.89 |
| Neo-Cis 40 | 30.00 | 0.910 | 32.967 | 23.89 |
| Zinc Oxide | 15.88 | 5.570 | 2.851 | 2.07 |
| Zn Stearate | 16.00 | 1.090 | 14.679 | 10.64 |

-continued

| Outer Core Layer Material | ACTUAL PHR | Sp.Gr. | Vol. | Vol. % |
|---|---|---|---|---|
| ZDA | 20.25 | 2.100 | 9.643 | 6.99 |
| Violet M.B. | 0.10 | 1.500 | 0.067 | 0.05 |
| Trigonox 42-40b Peroxide | 1.25 | 1.400 | 0.893 | 0.65 |
| TOTALS | 153.48 | 1.112 | 138.02 | 100.00 |

Compound S.G.=1.1120 Target S.G.=1.1120
   Polymer Vol.=79.62%
C) Inner Cover Layer

| MATERIALS | WEIGHT (POUNDS) | ACCUMULATIVE WGT. TARE SCALE TO 0 LBS. |
|---|---|---|
| Iotek EX 1002/5031/8420 | 90.0 | 90.0 |
| Iotek EX 1003/5041/7410 | 90.0 | 90.0 |

D) Outer Cover Layer

| Materials | Weight (Pounds) | Accumulative Weight | Weight % |
|---|---|---|---|
| White M.B. | 17.1 | 17.1 | 9.5 |
| Iotek 7510 | 73.8 | 164.7 | 41.0 |
| Iotek 7520 | 89.1 | 180.0 | 49.5 |

The materials and components produced a regulation size golf ball with a relatively large core and thin cover layers having the following characteristics:

| | | |
|---|---|---|
| Center or Inner Core Layer | Formula | "A" Above |
| | Size In. | 0.340 |
| | Wgt. Grams | 2.77 |
| | Shore C | 62 |
| Outer Core Layer | Formula | "B" Above |
| | Size In. | 1.47 |
| | Wgt. Grams | 32.45 |
| | Comp. Riehle | 0.137 (inches) |
| | C.O.R. | 0.767 |
| Inner Cover Layer | Cover Formula | "C" Above |
| | Size In. | 1.57 |
| | Wgt. Grams | 38.3 |
| | Comp. Riehle | 0.118 (inches) |
| | C.O.R. | 0.800 |
| | Mantle Thickness (In.) | 0.050 |
| Outer Cover Layer (Pre-Gamma Treatment) | Cover Formula | "D" Above |
| | Size In. | 1.684 |
| | Wgt. Grams | 45.3 |
| | Comp. Riehle | 0.104 (inches) |
| | C.O.R. | 0.788 |
| | Cover Thickness (In.) | 0.055 |
| Finished Ball (Post-Gamma Treatment) | Size In. | 1.682 |
| | Wgt. Grams | 45.4 |
| | Comp. Riehle | 0.085 (inches) |
| | C.O.R. | 0.798 |
| | Cover Thickness (In.) | 0.055 |
| | Shore D | 47 |

Example 7

The balls of the invention set forth in Example 5 were tested against various commercially available balls in order to determine the best combination of spin and distance.

The spin and distance tests set forth below are the standards that Applicants use routinely to evaluate golf ball performance. The distance tests and the chip shot, 9 iron and 5 iron spin tests have been used for a number of years. The 70 yard wedge was added recently because several tour players that Applicants test use this shot to determine if a ball will suit his/her game.

By ranking all the tests (longest to shortest distance, highest to lowest spin rate), then combining the rankings, Applicants have determined that the Strata Tour Ultimate ball of the invention has the best combination of spin and distance.

DISTANCE TEST DESCRIPTIONS

| Test | Pro Driver | USGA Driver | Amateur Driver | 5 Iron |
|---|---|---|---|---|
| Machine | True Temper | True Temper | True Temper | True Temper |
| Location | West Palm Bch. (WPB) | WPB | WPB | WPB |
| Club | 9.5 Graphite S. T.F. Int. 400 | 9.5 Graphite S. T.F. Int. 400 | 9.5 Graphite S. T.F. Int. 400 | Top-Flite Pro Grind |
| Launch Angle | 9.8 deg. | 10.1 deg. | 11.6 deg. | 14.4 deg. |
| Ball Speed | 229.5 fps | 229.7 fps | 189 fps | 180.8 fps |
| Spin Rate | 3147 rpm | 2948 rpm | 3715 rpm | 6084 rpm |
| Wind mph (180 = Tail) | 6.9 @ 110 deg. | 8.8 @ 110 deg. | 3.2 @ 125 deg. | 5.2 @ 180 deg. |
| Temp. deg.° F. | 74 | 72 | 61 | 81 |
| R.H. % | 56.3 | 68.3 | 81.4 | 55.5 |
| Set up Ball | Z-Balata 90 | Pinnacle Gold LS | Z-Balata 90 | Z-Balata 90 |

All driver tests: 12 Balls of each type, each ball hit twice.
5 Iron: 12 balls each type, each ball hit once.

SPIN TEST DESCRIPTIONS

| TEST | 5 Iron | 9 Iron | 70 Yd. Wedge | Chip Shot |
|---|---|---|---|---|
| Machine | True Temper | Golf Labs | True Temper | Miyamae |
| Location | WPB | Chicopee ITR | WPB | Chicopee ITR |
| Club | Top-Flite Pro Grind | Top-Flite Pro Grind | Top-Flite Tour 58 deg. | Stiff Arm Striker |
| Launch Angle | 14.4 deg. | 21.7 deg. | 28.9 deg. | 26.7 deg. |
| Ball Speed | 180.8 fps | 148.5 fps | 93.6 fps | 54.0 fps |
| Spin Rate | 6084 rpm | 9255 rpm | 9935 rpm | 4097 rpm |
| Set up Ball | Z-Balata 90 | Strata Tour Pro 90 | Z-Balata 90 | Strata Tour Pro 90 |
| No. of Shots | 12 | 9 | 12 | 9 |

COMPETITIVE GOLF BALL DISTANCE COMPARISON

| Ball Type | Pro Driver Yards | Rank | USGA Driver Yards | Rank | Amateur Driver Yards | Rank | 5 Iron Yards | Rank | Total Rank | Average Rank |
|---|---|---|---|---|---|---|---|---|---|---|
| Strata Tour Ultimate | 265 | 4 | 252 | 1 | 206 | 3 | 184 | 3 | 11 | 3 |
| Strata Tour Pro 90 | 261 | 7 | 250 | 3 | 205 | 4 | 186 | 2 | 16 | 4 |
| Titleist Pro V1 392 | 269 | 2 | 250 | 3 | 211 | 1 | 183 | 4 | 10 | 2 |
| Titleist Professional 90 | 263 | 6 | 247 | 6 | 204 | 6 | 182 | 5 | 23 | 6 |
| Titleist Tour Balata | 255 | 12 | 239 | 11 | 197 | 12 | 180 | 10 | 45 | 12 |
| Titleist Tour Prestige | 259 | 9 | 239 | 11 | 198 | 11 | 179 | 12 | 43 | 11 |
| Nike Tour Accuracy | 259 | 9 | 247 | 6 | 202 | 8 | 182 | 5 | 28 | 8 |
| Maxfli Revolution 90 | 265 | 4 | 246 | 9 | 205 | 4 | 181 | 7 | 24 | 7 |
| Precept Tour Premium | 261 | 7 | 247 | 6 | 201 | 10 | 181 | 7 | 30 | 9 |
| Taylor Made Inergel Tour | 258 | 11 | 243 | 10 | 202 | 8 | 180 | 10 | 39 | 10 |
| Callaway Red | 272 | 1 | 252 | 1 | 211 | 1 | 188 | 1 | 4 | 1 |
| Callaway Blue | 267 | 3 | 249 | 5 | 204 | 6 | 181 | 7 | 21 | 5 |

COMPETITIVE GOLF BALL SPIN COMPARISON

| Ball Type | Chip Spin RPM | Rank | 70 Yd. Wedge RPM | Rank | 9 Iron Spin RPM | Rank | 5 Iron Spin RPM | Rank | Total Rank | Avg. Rank Spin | Avg. Rank Dist. | Comb. Rank | Best Spin Dist. Rank |
|---|---|---|---|---|---|---|---|---|---|---|---|---|---|
| Strata Tour Ultimate | 4353 | 2 | 9832 | 5 | 9762 | 4 | 6051 | 9 | 20 | 5 | 3 | 8 | 1 |
| Strata Tour Pro 90 | 4097 | 6 | 9609 | 8 | 9255 | 9 | 5684 | 11 | 34 | 9 | 4 | 13 | 6 |
| Titleist Pro V1 392 | 4022 | 8 | 9707 | 6 | 9431 | 8 | 5890 | 10 | 32 | 7 | 2 | 9 | 2 |
| Titleist Professional 90 | 3987 | 10 | 9479 | 10 | 9592 | 6 | 6124 | 7 | 33 | 8 | 6 | 14 | 8 |
| Titleist Tour Balata | 4274 | 4 | 10001 | 3 | 10307 | 1 | 6666 | 1 | 9 | 2 | 12 | 14 | 8 |
| Titleist Tour Prestige | 4066 | 7 | 9643 | 7 | 9826 | 3 | 6311 | 2 | 19 | 4 | 11 | 15 | 10 |
| Nike Tour Accuracy | 4319 | 3 | 10175 | 2 | 9702 | 5 | 6227 | 4 | 14 | 3 | 8 | 11 | 4 |
| Maxfli Revolution 90 | 3975 | 11 | 9200 | 11 | 9195 | 10 | 6218 | 5 | 36 | 10 | 7 | 17 | 11 |
| Precept Tour Premium | 4383 | 1 | 10353 | 1 | 9838 | 2 | 6299 | 3 | 7 | 1 | 9 | 10 | 3 |
| Taylor Made Inergel Tour | 4005 | 9 | 9037 | 12 | 9017 | 12 | 6137 | 6 | 39 | 11 | 10 | 21 | 12 |
| Callaway Red | 3848 | 12 | 9515 | 9 | 9041 | 11 | 5226 | 12 | 44 | 12 | 1 | 13 | 6 |
| Callaway Blue | 4234 | 5 | 9847 | 4 | 9467 | 7 | 6066 | 8 | 24 | 6 | 5 | 11 | 4 |

The invention has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

What is claimed:

1. A solid golf ball comprising:
a dual core including an inner, high density, spherical center core layer and an outer core layer disposed about said spherical center core layer, wherein said spherical center core layer has a specific gravity from about 1.2 to about 12.0, a diameter of less than 0.590 inch, and a Shore C hardness of 70 or less and comprises a blend including a powdered metal and a first matrix material comprising an elastomeric base material, and wherein said outer core layer has a specific gravity of less than 2.0, a diameter of up to 1.60 inches and comprises a second matrix material selected from the group consisting of thermosets, thermoplastics, and combinations thereof;

an inner cover layer formed about said dual core having a thickness of about 0.03 inch to about 0.07 inch, the inner layer comprising an ionomer material; and an outer cover layer disposed on said inner cover layer having a thickness of about 0.010 to about 0.100 inch, the outer cover layer composed of a polyurethane material, wherein said outer cover layer has a Shore D hardness less than the Shore D hardness of the inner cover layer.

2. A solid golf ball comprising:

a dual core including an inner, high density, spherical center core layer and an outer core layer disposed about said spherical center core layer, wherein said spherical center core layer has a specific gravity of 2.0 or more, and a Shore C hardness of 50 to 95, and comprises a blend including a powdered metal and a first matrix material comprising an elastomeric base material and wherein said outer core layer comprises a second matrix material selected from the group consisting of thermosets, thermoplastics, and combinations thereof, wherein said outer core layer has a specific gravity of less than 1.2 and a diameter of up to 1.60 inches;

an inner cover layer formed about said dual core having a thickness of about 0.010 inches to about 0.050 inch and a Shore D hardness of 58 or more, the inner cover layer comprising a blend of ionomers, and wherein said inner cover layer is formed from at least one ionomer resin; and an outer cover layer disposed on said inner cover layer having a thickness of about 0.010 to about 0.055 inch and a Shore D hardness of 57 or less, the outer cover layer comprising a polyurethane material.

3. A solid golf ball comprising:

a dual core including an inner, high density, spherical center core layer and an outer core layer disposed about said spherical center core layer, wherein said spherical center core layer has a specific gravity of 2.7 or more, and a Shore C hardness of 50 to 95, and comprises a blend including a tungsten powdered material and a first matrix material comprising an elastomeric base material and wherein said outer core layer comprises a polybutadiene material, wherein said outer core layer has a specific gravity of less than 1.2;

an inner cover layer formed about said dual core having a thickness of about 0.010 inches to about 0.050 inch and a Shore D hardness of 58 or more, the inner cover layer comprising a blend of ionomers, and wherein said inner cover layer is formed from at least one ionomer resin; and an outer cover layer disposed on said inner cover layer having a thickness of about 0.010 to about 0.055 inch and a Shore D hardness of 57 or less, the outer cover layer comprising a polyurethane material.

* * * * *